(12) United States Patent
Pierick et al.

(10) Patent No.: US 8,137,600 B2
(45) Date of Patent: Mar. 20, 2012

(54) INJECTION MOLDING OF POLYMERIC MATERIAL

(75) Inventors: David E. Pierick, San Diego, CA (US); Jere R. Anderson, Newburyport, MA (US); Sung Woon Cha, Moonchon (KR); Liqin Chen, West Roxbury, MA (US); James F. Stevenson, Morristown, NJ (US); Dana E. Laing, Gloucester, MA (US)

(73) Assignee: Trexel, Inc., Woburn, MA (US)

( * ) Notice: Subject to any disclaimer, the term of this patent is extended or adjusted under 35 U.S.C. 154(b) by 266 days.

(21) Appl. No.: 11/894,101

(22) Filed: Aug. 20, 2007
(Under 37 CFR 1.47)

(65) Prior Publication Data
US 2008/0050576 A1    Feb. 28, 2008

Related U.S. Application Data

(60) Continuation of application No. 11/048,835, filed on Feb. 2, 2005, now Pat. No. 7,361,294, which is a division of application No. 09/335,946, filed on Jun. 18, 1999, now Pat. No. 6,884,823, which is a continuation-in-part of application No. 09/185,987, filed on Nov. 4, 1998, now abandoned, which is a continuation-in-part of application No. 09/008,171, filed on Jan. 16, 1998, now abandoned.

(60) Provisional application No. 60/035,631, filed on Jan. 16, 1997, provisional application No. 60/068,350, filed on Dec. 19, 1997.

(51) Int. Cl.
*B29C 44/00* (2006.01)
(52) U.S. Cl. ............... 264/45.1; 428/304.4; 425/587; 425/4 R; 425/817 R; 521/79; 264/50; 264/51; 366/76.1; 366/76.2; 366/81; 366/90

(58) Field of Classification Search ............... 425/587, 425/4 R, 817 R, 557–561; 264/50, 51–55; 366/76.1, 76, 2, 81, 90
See application file for complete search history.

(56) References Cited

U.S. PATENT DOCUMENTS
3,287,477 A * 11/1966 Vesilind .................. 264/53
(Continued)

FOREIGN PATENT DOCUMENTS
EP    0461298    12/1991
(Continued)

OTHER PUBLICATIONS
European Search Report, dated Jan. 21, 2005, for EP 1 512 509 A3.

*Primary Examiner* — Jeffrey T Barton
*Assistant Examiner* — Magali P Slawski
(74) *Attorney, Agent, or Firm* — Wolf, Greenfield & Sacks, P.C.

(57) ABSTRACT

Injection molding systems and methods useful for making microcellular foamed materials are provided as well as microcellular articles. Pressure drop rate and shear rate are important features in some embodiments, and the invention provides systems for controlling these parameters in an injection molding system. Another aspect involves an injection molding system including a nucleator that is upstream of a pressurized mold. Another aspect involves an extrusion system with the reciprocating screw for forming a single phase solution of non-nucleated blowing agent and polymeric material. Another aspect involves very thin walled microcellular material and very thin walled polymeric material. Another aspect provides a method for producing high weight reductions in very thin-walled parts with surfaces that have no noticeable differences from non-foamed parts.

9 Claims, 14 Drawing Sheets

U.S. PATENT DOCUMENTS

| | | | |
|---|---|---|---|
| 4,211,523 A | | 7/1980 | Hunerberg |
| 4,473,665 A | | 9/1984 | Martini-Vvedensky et al. |
| 4,778,631 A | * | 10/1988 | Cobbs et al. .................. 261/128 |
| 5,082,608 A | | 1/1992 | Karabedian et al. |
| 5,098,267 A | * | 3/1992 | Cheng ........................... 425/4 R |
| 5,160,674 A | | 11/1992 | Colton et al. |
| 5,334,356 A | * | 8/1994 | Baldwin et al. ................ 422/133 |
| 5,423,607 A | * | 6/1995 | Jones et al. .................... 366/132 |
| 5,866,053 A | | 2/1999 | Park et al. |
| 5,997,781 A | * | 12/1999 | Nishikawa et al. .......... 264/45.1 |
| 6,169,122 B1 | | 1/2001 | Blizard et al. |
| 6,231,942 B1 | | 5/2001 | Blizard et al. |
| 6,884,823 B1 | | 4/2005 | Pierick et al. |
| 7,361,294 B2 | | 4/2008 | Pierick et al. |

FOREIGN PATENT DOCUMENTS

| | | |
|---|---|---|
| EP | 0776745 | 6/1997 |
| JP | 5-329869 | 12/1993 |
| JP | 10-24436 | 1/1998 |
| JP | 10-230528 | 9/1998 |
| WO | WO 98/08667 | 3/1998 |

* cited by examiner

100u

100u

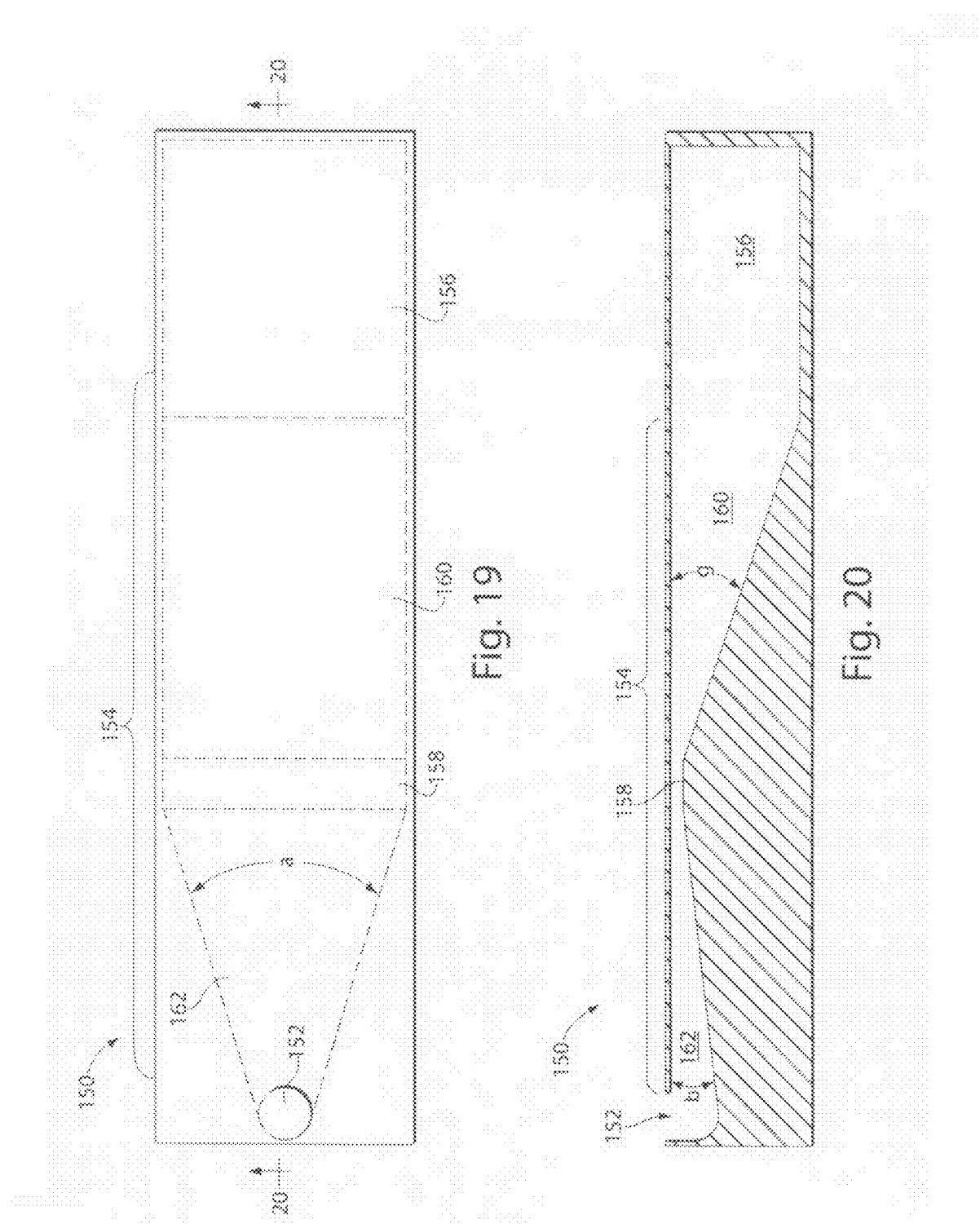

INJECTION MOLDING OF POLYMERIC MATERIAL

RELATED APPLICATIONS

This application is a continuation of U.S. application Ser. No. 11/048,835 filed Feb. 2, 2005, which is a divisional of Ser. No. 09/335,946, filed Jun. 18, 1999, which is a continuation-in-part of U.S. application Ser. No. 09/185,987, filed Nov. 4, 1998, which is a continuation-in-part of U.S. application Ser. No. 09/008,171, filed Jan. 16, 1998, which claims the benefit under Title 35, U.S.C. §119(e) of U.S. provisional application Ser. No. 60/068,350, filed Dec. 19, 1997, and U.S. provisional application Ser. No. 60/035,631, filed Jan. 16, 1997, all of which applications are incorporated herein by reference.

FIELD OF THE INVENTION

The present invention relates generally to polymeric structural foam processing, and more particularly to microcellular structural foams and systems and methods of manufacture.

BACKGROUND OF THE INVENTION

Structural foamed materials are known, and can be produced by injecting a physical blowing agent into a molten polymeric stream, dispersing the blowing agent in the polymer to form a two-phase mixture of blowing agent cells in polymer, injecting the mixture into a mold having a desired shape, and allowing the mixture to solidify therein. A pressure drop in the mixture can cause the cells in the polymer to grow. As an alternative to a physical blowing agent, a chemical blowing agent can be used which undergoes a chemical reaction in the polymer material causing formation of a gas. Chemical blowing agents generally are low molecular weight organic compounds that decompose at a critical temperature and release a gas such as nitrogen, carbon dioxide, or carbon monoxide. Under some conditions the cells can be made to remain isolated, and a closed-cell foamed material results. Under other, typically more violent foaming conditions, the cells rupture or become interconnected and an open-cell material results. A sample of standard injection molding techniques described in the patent literature follow.

U.S. Pat. No. 3,436,446 (Angell) describes a method and apparatus for molding foamed plastic articles with a solid skin by controlling the pressure and temperature of the mold.

U.S. Pat. No. 4,479,914 (Baumrucker) describes a foamed article forming method in which a mold cavity is pressurized with gas to prevent premature diffusion of blowing gas from the material injected into the cavity. Pre-pressurization gas is vented during injection of material to be foamed, finally to a vacuum chamber creating a vacuum that draws the material throughout the mold cavity.

Particularly low-density (high void volume) molded polymeric foam materials include expanded polypropylene (EPP) and expanded polystyrene (EPS). Precursors to EPP or EPS can be provided as beads of already partially or fully-foamed polypropylene or polystyrene, respectively. These beads typically are injected into a steam chest mold and fused together to form a structural foam product from the beads. In some cases, further expansion and foaming of the beads occurs within the steam chest (typically with EPS). While EPS and EPP are useful products for many applications, they can have a less than ideal appearance. Lines of fusion between beads can easily be observed by the naked eye in products such as styrene foam cups and other EPP or EPS products.

Microcellular material typically is defined by polymeric foam of very small cell size and various microcellular material is described in U.S. Pat. Nos. 5,158,986 and 4,473,665. These patents describe subjecting a single-phase solution of polymeric material and physical blowing agent to thermodynamic instability required to create sites of nucleation of very high density, followed by controlled cell growth to produce microcellular material. U.S. Pat. No. 4,473,665 (Martini-Vvedensky) describes a molding system and method for producing microcellular parts. Polymeric pellets are pre-pressurized with a gaseous blowing agent and melted in a conventional extruder to form a solution of blowing agent and molten polymer, which then is extruded into a pressurized mold cavity. The pressure in the mold is maintained above the solubility pressure of the gaseous blowing agent at melt temperatures for given initial saturation. When the molded part temperature drops to the appropriate critical nucleation temperature, the pressure on the mold is dropped, typically to ambient, and the part is allowed to foam.

U.S. Pat. No. 5,158,986 (Cha et al.) describes an alternative molding system and method for producing microcellular parts. Polymeric pellets are introduced into a conventional extruder and melted. A blowing agent of carbon dioxide in its supercritical state is established in the extrusion barrel and mixed to form a homogenous solution of blowing agent and polymeric material. A portion of the extrusion barrel is heated so that as the mixture flows through the barrel, a thermodynamic instability is created, thereby creating sites of nucleation in the molten polymeric material. The nucleated material is extruded into a pressurized mold cavity. Pressure within the mold is maintained by counter pressure of air. Cell growth occurs inside the mold cavity when the mold cavity is expanded and the pressure therein is reduced rapidly; expansion of the mold provides a molded and foamed article having small cell sizes and high cell densities. Nucleation and cell growth occur separately according to the technique; thermally-induced nucleation takes place in the barrel of the extruder, and cell growth takes place in the mold.

While the above and other reports represent several techniques associated with the manufacture of microcellular material and the manufacture of material via injection molding, a need exists in the art for improved microcellular injection molding processes.

It is, therefore, an object of the invention to provide injection molding systems and methods effective in producing microcellular structural foams and, in particular, very thin articles. It is another object to provide systems and methods useful in injection molding of microcellular structural foams, but also useful in injection molding of conventional foams and continuous extrusion of microcellular or conventional foams.

SUMMARY OF THE INVENTION

The present invention is directed to injection molding systems and methods capable of forming molded articles, and systems and methods for forming a variety of foamed materials. In each of the various aspects of the invention described herein, in one set of embodiments the material is not microcellular foamed material as defined by cell size and densities, and in another set of embodiments the material is microcellular material.

The present invention involves, according to one aspect, an injection molding system constructed to produce microcellular structural foamed articles. The system includes an extruder having an inlet at an inlet end thereof designed to receive a precursor of microcellular material, a molding chamber, and an enclosed passageway connecting the inlet with the molding chamber. The molding chamber is constructed and arranged to receive a non-nucleated, homogeneous, fluid, single-phase solution of a polymeric material and a blowing agent, to contain the non-nucleated, homogeneous fluid single-phase solution of the polymeric material and the blowing agent in a fluid state at an elevated pressure within the passageway and to advance the solution as a fluid stream within the passageway in a downstream direction from the inlet end toward the molding chamber. The enclosed passageway includes a nucleating pathway in which blowing agent in the single-phase solution passing therethrough is nucleated. The nucleating pathway is constructed to include a polymer receiving end which receives a homogeneous fluid, single-phase solution of a polymeric material and a non-nucleated blowing agent, a nucleated polymer releasing end constructed and arranged to release nucleated polymeric material, and a fluid pathway connecting the receiving end to the releasing end. Optionally, the polymer releasing end can define an orifice of the molding chamber, or can be in fluid communication with the molding chamber. The nucleating pathway is constructed to have length and cross-sectional dimensions such that, the system is capable of subjecting fluid polymer admixed homogeneously with blowing agent to a pressure drop rate while passing through the pathway of at least about 0.1 GPa/sec, or at least about 0.3 GPa/sec, or at least about 1.0 GPa/sec, or at least about 3 GPa/sec, or at least about 10 GPa/sec, or at least about 100 GPa/sec. The nucleating pathway can also be constructed to have a variable cross-sectional dimension such that a fluid polymer flowing through the pathway is subjected to a variable pressure drop rate and/or temperature rise.

According to another aspect of the invention a system is provided having a molding chamber constructed and arranged to contain nucleated polymeric material at an elevated pressure in order to prevent cell growth at the elevated pressure. The pressurized molding chamber can be fluidly or mechanically pressurized in order to contain the nucleated polymeric material at such an elevated pressure. After reduction of the pressure on the pressurized molding chamber, the polymeric material can solidify the shape of a desired microcellular polymeric article as the molding chamber is constructed and arranged to have such an interior shape.

According to yet another aspect of the invention, the system is provided having a barrel with an inlet designed to receive a precursor of extruded material, an outlet designed to release a fluid non-nucleated mixture of blowing agent and foamed polymeric article precursor to the precursor, an orifice connectable to a source of the blowing agent, and a screw mounted for reciprocation within the barrel. The extrusion system can also have at least two orifices connectable to a source of the blowing agent and the orifice can be arranged longitudinally along the axis of the barrel in order to sequentially introduce the non-nucleated mixture through at least the two orifices into the barrel as the screw reciprocates. The system can also include a second extrusion barrel connected in tandem with the first barrel where the second barrel has an inlet designed to receive the fluid non-nucleated mixture and has a screw mounted for reciprocation within the barrel.

According to another aspect, the invention provides a method for establishing a continuous stream of the non-nucleated, fluid, single-phase solution of polymeric precursor and blowing agent, nucleating the stream to create a nucleated stream of the mixture, passing the nucleated stream into the enclosure, and allowing the mixture to solidify in the shape of the enclosure. Optionally, the stream can be continuously nucleated by continuously subjecting it to a pressure drop of a rate of at least about 0.1 GPa/sec while passing the stream into the enclosure, to create a continuous stream of nucleated material. Alternatively, the method involves intermittently nucleating the stream by subjecting it to a pressure drop at a rate of at least about 0.1 GPa/sec, while passing the stream into the enclosure so that non-nucleated material passes into the enclosure first, followed by the nucleated material. Conversely, the nucleated stream may be passed into the enclosure so that nucleated material passes into the enclosure, first followed by non-nucleated material. The method also involves removing a solidified microcellular article from the enclosure, and in a period of less than about 10 minutes providing a second nucleated mixture in the enclosure, allowing the second mixture to solidify in the shape of the enclosure, and removing a second solidified microcellular article from the enclosure.

The invention also provides a method involving accumulating a charge of a precursor of foamed polymeric material and a blowing agent, heating a first portion of the charge defining at least about 2% of the charge to a temperature at least about 10° C. higher than the average temperature of the charge, and injecting the charge into a molding chamber.

Also provided is a method involving accumulating, in an accumulator fluidly connected to a molding chamber, a charge including a first portion comprising a fluid polymeric material essentially free of blowing agent and a second portion comprising a fluid polymeric material mixed with a blowing agent, and injecting the charge from the accumulator into a molding chamber.

Also provided is a method involving injecting a fluid, single-phase solution of a precursor of foamed polymeric material and a blowing agent into a molding chamber from an accumulator in fluid communication with extrusion apparatus while nucleating the solution to create a nucleated mixture, and allowing the mixture to solidify as a polymeric microcellular article in the molding chamber.

Also provided is a method involving injecting a blowing agent into an extruder barrel of polymer extrusion apparatus while an extrusion screw is moving axially within the barrel.

Also provided is a method involving injecting a blowing agent from an extrusion screw into a barrel of polymer extrusion apparatus.

Also provided is a method involving establishing in a barrel of extrusion apparatus a fluid polymeric article precursor, withdrawing a portion of the fluid precursor from the barrel, mixing the portion of the fluid precursor with blowing agent to form a mixture of the blowing agent and the portion of the fluid precursor, and introducing the mixture into the barrel.

Also provided is a method involving introducing polymeric material admixed with supercritical fluid into a mold including a portion having an interior dimension of less than about 0.125 inch and allowing the polymeric material to solidify in the mold.

Also provided is a method involving establishing a mixture of at least two, dissimilar, molten polymeric components with a super critical fluid blowing agent, and extruding the mixture to form a non-delaminated foam of the at least two components.

Also provided is a method involving injecting a single phase solution of polymeric material and blowing agent into an open mold, then closing the mold and forming a microcellular article in the shape of the mold.

Also provided is a method involving establishing a single-phase, non-nucleated solution of a polymeric material and blowing agent, introducing the solution into a molding chamber while nucleating the solution, cracking the mold thereby allowing cell growth to occur, and recovering a microcellular polymeric article having a shape similar to that of the molding chamber but being larger than the molding chamber.

Also provided is a method involving forming in an extruder a non-nucleated, homogeneous, fluid, single-phase solution of a precursor of microcellular polymeric material and a blowing agent, filling a molding chamber with the solution while nucleating the solution to form within the molding chamber a nucleated microcellular polymeric material precursor.

Also provided is a method involving injecting a fluid polymeric material/blowing agent mixture into a molding chamber and allowing the mixture to solidify as a microcellular polymeric article in the molding chamber and removing a solidified microcellular polymeric article from the molding chamber, and in a period of less than about ten minutes, providing a second polymeric/blowing agent mixture into the chamber and allowing the mixture to solidify as a second microcellular polymeric article in the chamber and removing the second microcellular polymeric article from the chamber.

Also provided is a method involving injecting a polymeric/blowing agent mixture into a molding chamber at a melt temperature of less than about 400° F., and molding in the chamber a solid foam polymeric article having a void volume of at least about 5% and a length-to-thickness ratio of at least about 50:1. In certain embodiments of this method, the melt temperature is less than about 380° F., in some embodiments less than about 300° F., and in other embodiments less than about 200° F.

Also provided is a method that involves injecting non-foamed polymeric material into a molding chamber and allowing the polymeric material to form a microcellular polymeric article having a shape essentially identical to that of the molding chamber. The article includes at least one portion having cross-sectional dimensions of at least about ½ inch in each in each of three perpendicular intersecting cross-sectional axes and a void volume of at least 50%.

Another method provided by the invention involves injecting a fluid precursor of foamed polymeric material into a molding chamber at a molding chamber temperature of less than about 100° C., and allowing the mixture to solidify in the molding chamber as a polymeric microcellular article. The article includes at least one portion having cross-sectional dimensions of at least ½ inch in each of three perpendicular intersecting cross-sectional axes and a void volume of at least about 50%. The molding chamber temperature can be less than about 75° C., 50° C., or 30° C., and the foamed polymeric material can be polyolefin.

Another method involves injecting a non-foamed polymeric material into a molding chamber and allowing the mixture to solidify in the molding chamber as a polymeric microcellular article having a void volume of at least about 50%, and repeating the injecting and allowing steps at a cycle time of less than about one minute.

Another method provided by the invention involves injecting a fluid, single-phase solution of polymeric material and blowing agent into a molding chamber while subjecting the solution to a rapid pressure drop at a first pressure drop rate that is sufficient to cause microcellular nucleation. Essentially immediately thereafter cell growth is allowed and controlled by subjecting the material to a second pressure drop that is less than the first pressure drop and at a decreasing rate.

The systems of the invention include one including an accumulator having an inlet for receiving a precursor of foamed polymeric material and a blowing agent, and an outlet, a molding chamber having an inlet in fluid communication with the outlet of the accumulator, and heating apparatus associated with the accumulator constructed and arranged to heat, during operation of the system, a first section of the accumulator proximate the molding chamber to a temperature at least about 10° C. higher than the average temperature of the accumulator.

Also provided is a system including an extruder having an inlet for receiving a precursor of foamed polymeric material and being constructed and arranged to produce fluid polymeric material from the precursor, a first outlet positioned to deliver fluid polymeric material from the extruder, a blowing agent inlet downstream of the first outlet connectable to a source of a physical blowing agent, a mixing region downstream of the blowing agent inlet constructed and arranged to produce a mixture of fluid polymeric precursor and blowing agent, and a second outlet downstream of the mixing region positioned to deliver the mixture of fluid polymeric precursor and blowing agent, and an accumulator having a first inlet fluidly connected to the first outlet of the extruder and a second inlet fluidly connected to the second outlet of the extruder.

Also provided is a system for producing injection-molded microcellular material, including an extruder having an outlet at an outlet end thereof designed to release a non-nucleated, homogeneous, fluid, single-phase solution of a polymeric material and a blowing agent, and a molding chamber having an inlet in fluid communication with the outlet of the extruder. The system is constructed and arranged to deliver from the extruder outlet to the molding chamber inlet the single-phase solution and, during filling of the molding chamber, to nucleate the single-phase solution to form within the chamber a nucleated microcellular polymeric material precursor.

Also provided is an extrusion system including a barrel having an inlet designed to receive a precursor of extruded material, an outlet designed to release a fluid mixture of non-nucleated blowing agent and the precursor, an orifice connectable to a source of blowing agent, and a screw mounted for reciprocation within the barrel.

Also provided is a system for producing injection-molded microcellular material including an extruder having an outlet at an outlet end thereof designed to release a precursor of microcellular polymeric material and a blowing agent, and a molding chamber having an inlet in fluid communication with the outlet of the extruder. The system is constructed and arranged to cyclically inject the precursor of microcellular polymeric material and the blowing agent into the molding chamber.

The invention also provides an extrusion system including a barrel having an inlet designed to receive a precursor of extruded material, and outlet designed to release a fluid mixture of non-nucleated blowing agent and precursor, and an orifice connected to a source of blowing agent. A screw is mounted for reciprocation within the barrel.

Another system provided by the invention for producing molten polymeric microcellular material includes an inlet instructed and arranged to receive a precursor of molten polymeric microcellular material, a molding chamber, and a channel connecting the inlet with the molding chamber. The channel includes a divergent portion between the inlet and the molding chamber that increases in width by at least about 100% while maintaining a cross-sectional area changing by no more than about 25%.

Another system of the invention includes an inlet constructed and arranged to receive a precursor of molten polymeric microcellular material, a molding chamber, and a channel connecting the inlet with the molding chamber. The channel includes a nucleating pathway having length and cross-sectional dimensions that, when a fluid, single-phase solution of polymeric material and blowing agent is passed through the pathway at rates for which the system is constructed, creates a pressure drop in the fluid pathway at a pressure drop rate sufficient to cause microcellular nucleation. The channel includes a cell growth region between the nucleating pathway and the molding chamber that increases in cross-sectional dimension in the direction of the molding chamber.

Another system of the invention is as described immediately above but, while not necessarily including the cell growth region that increases in cross-sectional dimension, includes a nucleating pathway having a width to height ratio of at least about 1.5:1.

Another system of the invention is similar to that described immediately above but, while the nucleating pathway need not necessarily have a width to height ration of at least 1.5:1, has a width equal to one dimension of the molding chamber.

In another aspect, the invention provides a method that involves injecting a blowing agent into an extruder barrel of polymer extrusion apparatus while an extrusion screw is moving axially within the barrel. In one embodiment, the method involves injecting a blowing agent from an extrusion screw into a barrel of polymer extrusion apparatus. This injection technique can be used with any of a wide variety of microcellular and conventional techniques. In another aspect, the invention involves an extrusion screw constructed and arranged for rotation within a barrel of polymer extrusion apparatus that includes, within the screw, a lumen communicating with an orifice in a surface of the screw. The lumen can be used to inject blowing agent into the extrusion barrel.

In another aspect the invention provides a system for producing injection-molded articles. The system includes an extruder, a molding chamber, a runner fluidly connecting the extruder and the molding chamber, and a temperature control device in thermal communication with the runner. In another aspect, the invention involves establishing a fluid mixture blowing agent and injection-molded material precursor in an extruder, passing the mixture through a runner into a molding chamber, solidifying the portion of the fluid mixture in the chamber while maintaining a portion of the mixture in the runner in a fluid state, and injecting additional fluid mixture into the runner thereby urging the portion of the fluid mixture and the runner into the chamber.

The invention also provides a method that involves withdrawing a portion of a fluid polymeric article precursor from an extrusion barrel, mixing the portion of the fluid precursor with blowing agent to form a mixture, and re-introducing the mixture into the barrel.

The invention also provides a system including an extruder with an extruder barrel, a molding chamber, and a mixing chamber in fluid communication with a first, upstream orifice in the barrel, a second, downstream orifice in the barrel, and a source of a blowing agent.

In another aspect, the invention provides a molded foam article having a shape essentially identical to that of a molding chamber, including at least one portion having a cross-sectional dimension of no more than about 0.125 inch.

Another aspect involves a three-dimensional polymeric foam article having three intersecting, principal axes corresponding to the three dimensions, one of the dimensions associated with a first axis varying as a function of position along a second, perpendicular axis. The article includes at least one portion having a cross-sectional dimension of no more than about 0.125 inch and has a void volume of at least about 20%.

Another aspect involves a three-dimensional polymeric foam article having three intersecting, principal axes corresponding to the three dimensions, one of the dimensions associated with a first axis varying as a function of position along a second, perpendicular axis. The article includes at least one portion having a cross-sectional dimension of no more than about 0.125 inch.

In another aspect, the invention provides an injection molded polymeric part having a length-to-thickness ratio of at least about 50:1, the polymer having a melt index of less than about 10.

In another aspect, the invention provides an injection molded polymeric part having a length-to-thickness ratio of at least about 120:1, the polymer having a melt flow rate of less than about 40.

In another aspect, the invention provides an injection molded polymeric foam having a void volume of at least about 5%, and having a surface that is free of splay and swirl visible to the naked human eye.

In another embodiment, the invention provides an article having a thickness of less than about 0.125 inch at a void volume of at least about 20%. A method of making such an article is provided as well, that can involve introducing polymeric material admixed with a supercritical fluid into a mold including a portion having an interior dimension of less than about 0.125 inch, and allowing the polymeric material to solidify in the mold, the introducing and allowing steps taking place within a period of time of less than 10 seconds.

The invention, in another embodiment, provides a molded polymeric article having a shape essentially identical to that of a molding chamber and including at least one portion having a cross-sectional dimension of at least ½ inch in each of three perpendicular intersecting cross-sectional axes. The article has a void volume of at least about 50% and is defined by cells including cell walls of average cell wall thickness. The article is free of periodic solid boundaries of thickness greater than about five time the average cell wall thickness.

In another embodiment, the invention provides a molded polymeric foam article including at least one portion having a cross-sectional dimension of no more than about 0.075 inch and a void volume of at least about 5%.

The invention, in another embodiment, provides a molded polymeric foam article including at least one portion having a cross-sectional dimension of between about 0.075 inch and about 0.125 inch and a void volume of at least about 10%.

In another embodiment, the invention provides a molded polymeric foam article including at least one portion having a cross-sectional dimension of between about 0.125 inch and about 0.150 inch and a void volume of at least about 15%.

In another embodiment, the invention provides a molded polymeric foam article including at least one portion having a cross-sectional dimension of between about 0.150 inch and about 0.350 inch and a void volume of at least about 20%.

The invention, in another embodiment, a molded polymeric article including a plurality of cells wherein at least 70% of the total number of cells have a cell size of less than 150 microns.

In another embodiment, the invention provides a system. The system includes a barrel having an inlet, at an upstream end, designed to receive a polymeric article precursor, and an outlet at a downstream end. The barrel includes a blowing agent port, between the upstream end and the downstream end, fluidly connectable to a blowing agent source for introducing blowing agent from the source into the precursor in the barrel to form a mixture of precursor material and blowing agent in the barrel. The system also includes a metering device having an inlet connected to the blowing agent source and an outlet connected to the barrel. The metering device constructed and arranged to meter the mass flow rate of the blowing agent from the blowing agent source to the blowing agent port. The system further includes a molding chamber having an inlet in fluid communication with the outlet of the barrel to receive the mixture of precursor material and blowing agent from the barrel.

The invention, in another embodiment, provides a method of forming a polymeric foam article. The method includes urging a stream of polymeric article precursor flowing in a downstream direction within a barrel of an extrusion apparatus. The method further includes introducing a blowing agent into the stream at a rate metered by the mass flow of the blowing agent to form a mixture of fluid polymeric article precursor and blowing agent. The method further includes injecting the mixture of fluid polymeric article precursor into a molding chamber fluidly connected to the barrel.

The invention, in another embodiment, provides a system. The system includes a barrel having an inlet, at an upstream end, designed to receive a polymeric article precursor, and an outlet, at a downstream end. The barrel includes, between the upstream end and the downstream end, a blowing agent port having a plurality of orifices. The blowing agent port is fluidly connectable to a blowing agent source for introducing blowing agent from the source into the precursor in the barrel through respective orifices to form a mixture of precursor material and blowing agent in the barrel. The system further includes a molding chamber having an inlet in fluid communication with the outlet of the barrel to receive the mixture of precursor material and blowing agent from the barrel.

The invention, in another embodiment, provides a method for forming a polymeric article. The method includes urging a stream of polymeric article precursor flowing in a downstream direction within a barrel of an extrusion apparatus. The method further includes introducing a blowing agent from a blowing agent source into the stream through a plurality of orifices in a blowing agent port fluidly connecting the barrel with the blowing agent source to form a mixture of precursor material and blowing agent, and injecting the mixture of precursor material into a molding chamber fluidly connected to the barrel.

In another embodiment, the invention provides a system for producing injection-molded microcellular material The system includes an accumulator constructed and arranged to accumulate a precursor of microcellular material and a blowing agent, and including an outlet. The system further includes an injector constructed and arranged to cyclically inject the precursor of microcellular material through the outlet of the accumulator. The system further includes a molding chamber having an inlet in fluid communication with the outlet of the accumulator. The molding chamber constructed and arranged to receive the precursor of microcellular material.

In another embodiment, the invention provides a method. The method includes accumulating a charge of a precursor of microcellular polymeric material and a blowing agent, and injecting the charge into a molding chamber.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

In the drawings:

FIG. 19 illustrates a top view of a molding system according to another embodiment of the invention; and FIG. 20 is a side, cross-sectional view through line 20-20 of FIG. 19.

DETAILED DESCRIPTION OF THE INVENTION

Figure 1:
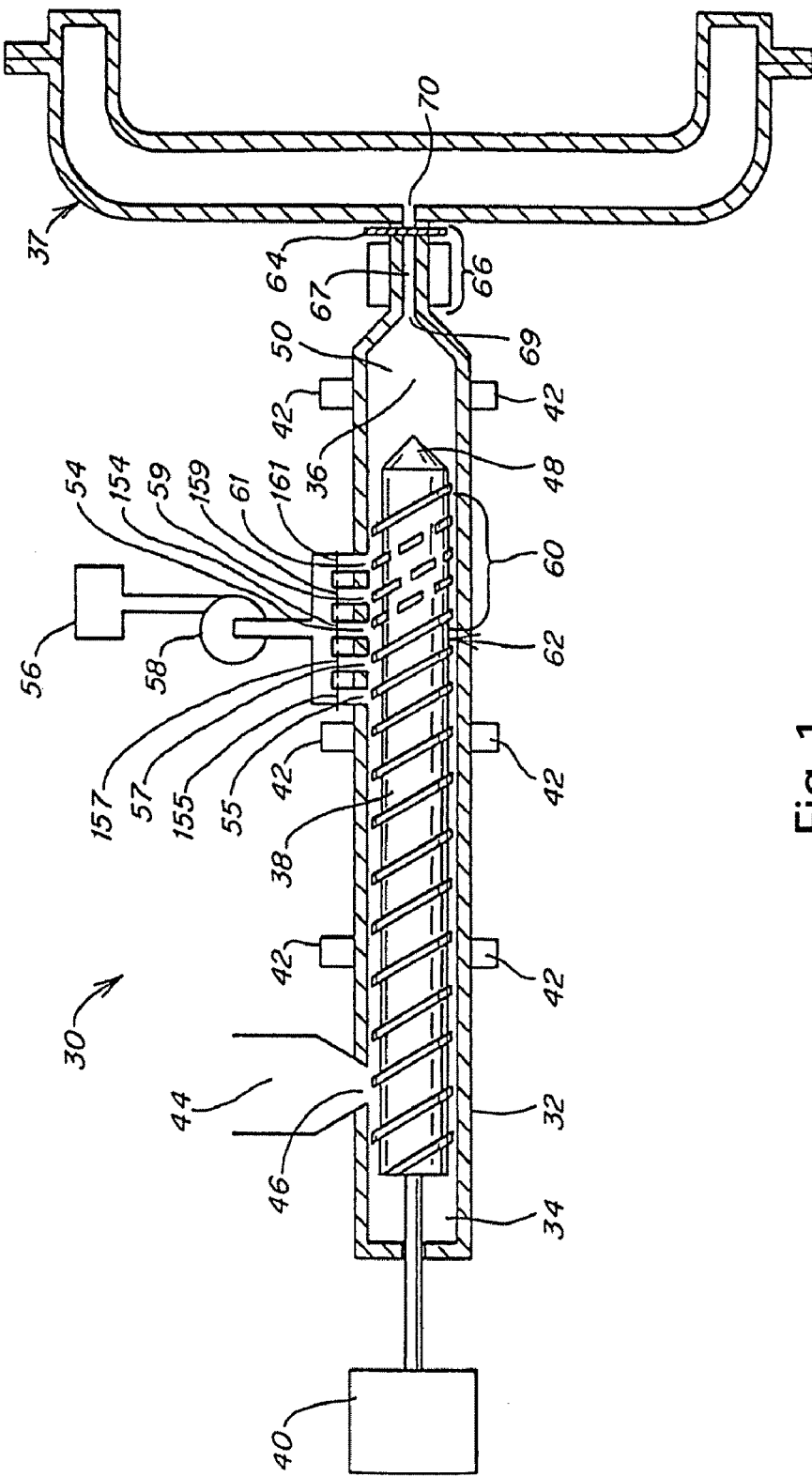
FIG. 1 illustrates a microcellular injection or intrusion molding system of the present invention, including an extrusion system having a nucleating pathway defining an orifice of a molding chamber.

Commonly-owned, co-pending U.S. patent application Ser. No. 08/777,709, entitled "Method and Apparatus for Microcellular Polymer Extrusion", filed Dec. 20, 1996, and commonly-owned, co-pending international patent publication nos. WO 98/08667, published Mar. 5, 1998 and WO 98/31521, published Jul. 23, 1998, are incorporated herein by reference.

The various embodiments and aspects of the invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a mixture in which sites of aggregation of at least several molecules of blowing agent are formed. Nucleation defines that transitory state when gas, in solution in a polymer melt, comes out of solution to form a suspension of bubbles within the polymer melt. Generally this transition state is forced to occur by changing the solubility of the polymer melt from a state of sufficient solubility to contain a certain quantity of gas in solution to a state of insufficient solubility to contain that same quantity of gas in solution. Nucleation can be effected by subjecting the homogeneous, single-phase solution to rapid thermodynamic instability, such as rapid temperature change, rapid pressure drop, or both. Rapid pressure drop can be created using a nucleating pathway, defined below. Rapid temperature change can be created using a heated portion of an extruder, a hot glycerine bath, or the like. "Microcellular nucleation", as used herein, means nucleation at a cell density high enough to create microcellular material upon controlled expansion. A "nucleating agent" is a dispersed agent, such as talc or other filler particles, added to a polymer and able to promote formation of nucleation sites from a single-phase, homogeneous solution. Thus "nucleation sites" do not define locations, within a polymer, at which nucleating agent particles reside. "Nucleated" refers to a state of a fluid polymeric material that had contained a single-phase, homogeneous solution including a dissolved species that is a gas under ambient conditions, following an event (typically thermodynamic instability) leading to the formation of nucleation sites. "Non-nucleated" refers to a state defined by a homogeneous, single-phase solution of polymeric material and dissolved species that is a gas under ambient conditions, absent nucleation sites. A "non-nucleated" material can include nucleating agent such as talc. A "polymeric material/blowing agent mixture" can be a single-phase, non-nucleated solution of at least the two, a nucleated solution of at least the two, or a mixture in which blowing agent cells have grown. "Nucleating pathway" is meant to define a pathway that forms part of microcellular polymeric foam extrusion apparatus and in which, under conditions in which the apparatus is designed to operate (typically at pressures of from about 1500 to about 30,000 psi upstream of the nucleator and at flow rates of greater than about 10 pounds polymeric material per hour), the pressure of a single-phase solution of polymeric material admixed with blowing agent in the system drops below the saturation pressure for the particular blowing agent concentration at a rate or rates facilitating rapid nucleation. A nucleating pathway defines, optionally with other nucleating pathways, a nucleation or nucleating region of a device of the invention. "Reinforcing agent", as used herein, refers to auxiliary, essentially solid material constructed and arranged to add dimensional stability, or strength or toughness, to material. Such agents are typified by fibrous material as described in U.S. Pat. Nos. 4,643,940 and 4,426,470. "Reinforcing agent" does not, by definition, necessarily include filler or other additives that are not constructed and arranged to add dimensional stability. Those of ordinary skill in the art can test an additive to determine whether it is a reinforcing agent in connection with a particular material.

The present invention provides systems and methods for the intrusion and injection molding of polymeric material, including microcellular polymeric material, and systems and methods useful in intrusion and injection molding and also useful in connection with other techniques. For example, although injection and intrusion molding are primarily described, the invention can be modified readily by those of ordinary skill in the art for use in other molding methods such as, without limitation, low-pressure molding, co-injection molding, laminar molding, injection compression, and the like. For purposes of the present invention, microcellular material is defined as foamed material having an average cell size of less than about 100 microns in diameter, or material of cell density of generally greater than at least about $10^6$ cells per cubic centimeter, or preferably both. Non-microcellular foams have cell sizes and cell densities outside of these ranges. The void fraction of microcellular material generally varies from 5% to 98%. Supermicrocellular material is defined for purposes of the invention by cell sizes smaller than 1 µm and cell densities greater than $10^{12}$ cells per cubic centimeter.

In preferred embodiments, microcellular material of the invention is produced having average cell size of less than about 50 microns. In some embodiments particularly small cell size is desired, and in these embodiments material of the invention has average cell size of less than about 20 microns, more preferably less than about 10 microns, and more preferably still less than about 5 microns. The microcellular material preferably has a maximum cell size of about 100 microns. In embodiments where particularly small cell size is desired, the material can have maximum cell size of about 50 microns, more preferably about 25 microns, more preferably about 15 microns, more preferably about 8 microns, and more preferably still about 5 microns. A set of embodiments includes all combinations of these noted average cell sizes and maximum cell sizes. For example, one embodiment in this set of embodiments includes microcellular material having an average cell size of less than about 30 microns with a maximum cell size of about 50 microns, and as another example an average cell size of less than about 30 microns with a maximum cell size of about 35 microns, etc. That is, microcellular material designed for a variety of purposes can be produced having a particular combination of average cell size and a maximum cell size preferable for that purpose. Control of cell size is described in greater detail below.

In one embodiment, essentially closed-cell microcellular material is produced in accordance with the techniques of the present invention. As used herein, "essentially closed-cell" is meant to define material that, at a thickness of about 100 microns, contains no connected cell pathway through the material.

Referring now to FIG. 1, a molding system 30 is illustrated schematically that can be used to carry out molding according to a variety of embodiments of the invention. System 30 of FIG. 1 includes a barrel 32 having a first, upstream end 34, and a second, downstream end 36 connected to a molding chamber 37. Mounted for rotation within barrel 32 is a screw 38 operably connected, at its upstream end, to a drive motor 40. Although not shown in detail, screw 38 includes feed, transition, gas injection, mixing, and metering sections.

Positioned along barrel 32, optionally, are temperature control units 42. Control units 42 can be electrical heaters, can include passageways for temperature control fluid, and or the like. Units 42 can be used to heat a stream of pelletized or fluid polymeric material within the barrel to facilitate melting, and/or to cool the stream to control viscosity and, in some cases, blowing agent solubility. The temperature control units can operate differently at different locations along the barrel, that is, to heat at one or more locations, and to cool at one or more different locations. Any number of temperature control units can be provided.

Barrel 32 is constructed and arranged to receive a precursor of polymeric material. As used herein, "precursor of polymeric material" is meant to include all materials that are fluid, or can form a fluid and that subsequently can harden to form a microcellular polymeric article. Typically, the precursor is defined by thermoplastic polymer pellets, but can include other species. For example, in one embodiment the precursor can be defined by species that will react to form microcellular polymeric material as described, under a variety of conditions. The invention is meant to embrace production of microcellular material from any combination of species that together can react to form a polymer, typically monomers or low-molecular-weight polymeric precursors which are mixed and foamed as the reaction takes place. In general, species embraced by the invention include thermosetting polymers in which a significant increase in molecular weight of the polymer occurs during reaction, and during foaming, due to crosslinking of polymeric components. For example, polyamides of the condensation and addition type, including aliphatic and aromatic polyamides such as polyhexamethyleneadipamide, poly(e-caprolactam), polyenes such as cycloaromatic polymers including polydicyclopentadiene, acrylic polymers such as polyacrylamide, polyacrylamate, acrylic ester polymers such as 2-cyanoacrylic ester polymers, acrylonitrile polymers, and combinations.

Preferably, a thermoplastic polymer or combination of thermoplastic polymers is selected from among amorphous, semicrystalline, and crystalline material including polyolefins such as polyethylene and polypropylene, fluoropolymers, cross-linkable polyolefins, polyamides, polyvinyl chloride, and polyaromatics such as styrenic polymers including polystyrene. Thermoplastic elastomers can be used as well, especially metallocene-catalyzed polyethylene.

Typically, introduction of the precursor of polymeric material utilizes a standard hopper 44 for containing pelletized polymeric material to be fed into the extruder barrel through orifice 46, although a precursor can be a fluid prepolymeric material injected through an orifice and polymerized within the barrel via, for example, auxiliary polymerization agents. In connection with the present invention, it is important only that a fluid stream of polymeric material be established in the system.

Immediately downstream of downstream end 48 of screw 38 in FIG. 1 is a region 50 which can be a temperature adjustment and control region, auxiliary mixing region, auxiliary pumping region, or the like. For example, region 50 can include temperature control units to adjust the temperature of a fluid polymeric stream prior to nucleation, as described below. Region 50 can include instead, or in addition, additional, standard mixing units (not shown), or a flow-control unit such as a gear pump (not shown). In another embodiment, region 50 can be replaced by a second screw in tandem which can include a cooling region. In an embodiment in which screw 38 is a reciprocating screw in an injection molding system, described more fully below, region 50 can define an accumulation region in which a single-phase, non-nucleated solution of polymeric material and a blowing agent is accumulated prior to injection into mold 37.

Microcellular material production according to the present invention preferably uses a physical blowing agent, that is, an agent that is a gas under ambient conditions (described more fully below). However, chemical blowing agents can be used and can be formulated with polymeric pellets introduced into hopper 44. Suitable chemical blowing agents include those typically relatively low molecular weight organic compounds that decompose at a critical temperature or another condition achievable in extrusion and release a gas or gases such as nitrogen, carbon dioxide, or carbon monoxide. Examples include azo compounds such as azo dicarbonamide.

As mentioned, in preferred embodiments a physical blowing agent is used. One advantage of embodiments in which a physical blowing agent, rather than a chemical blowing agent, is used is that recyclability of product is maximized. Use of a chemical blowing agent typically reduces the attractiveness of a polymer to recycling since residual chemical blowing agent and blowing agent by-products contribute to an overall non-uniform recyclable material pool. Since foams blown with chemical blowing agents inherently include a residual, unreacted chemical blowing agent after a final foam product has been produced, as well as chemical by-products of the reaction that forms a blowing agent, material of the present invention in this set of embodiments includes residual chemical blowing agent, or reaction by-product of chemical blowing agent, in an amount less than that inherently found in articles blown with 0.1% by weight chemical blowing agent or more, preferably in an amount less than that inherently found in articles blown with 0.05% by weight chemical blowing agent or more. In particularly preferred embodiments, the material is characterized by being essentially free of residual chemical blowing agent or free of reaction by-products of chemical blowing agent. That is, they include less residual chemical blowing agent or by-product that is inherently found in articles blown with any chemical blowing agent. In this embodiment, along barrel 32 of system 30 is at least one port 54 in fluid communication with a source 56 of a physical blowing agent. Any of a wide variety of physical blowing agents known to those of ordinary skill in the art such as helium, hydrocarbons, chlorofluorocarbons, nitrogen, carbon dioxide, and the like can be used in connection with the invention, or mixtures thereof, and, according to a preferred embodiment, source 56 provides carbon dioxide as a blowing agent. Supercritical fluid blowing agents are especially preferred, in particular supercritical carbon dioxide. In one embodiment solely supercritical carbon dioxide is used as blowing agent. Supercritical carbon dioxide can be introduced into the extruder and made to form rapidly a single-phase solution with the polymeric material either by injecting carbon dioxide as a supercritical fluid, or injecting carbon dioxide as a gas or liquid and allowing conditions within the extruder to render the carbon dioxide supercritical in many cases within seconds. Injection of carbon dioxide into the extruder in a supercritical state is preferred. The single-phase solution of supercritical carbon dioxide and polymeric material formed in this manner has a very low viscosity which advantageously allows lower temperature molding, as well as rapid filling of molds having close tolerances to form very thin molded parts, which is discussed in greater detail below.

A pressure and metering device 58 typically is provided between blowing agent source 56 and that at least one port 54. Device 58 can be used to meter the mass of the blowing agent between 0.04 lbs/hour and 70 lbs/hour, and more preferably, between 0.2 lbs/hour and 12 lbs/hour so as to control the amount of the blowing agent in the polymeric stream within the extruder to maintain blowing agent at a desired level. According to one set of embodiments, the amount of blowing agent in the polymeric stream is between about 1% and 25% by weight of the mixture of polymeric material and blowing agent, preferably between about 6% and 20% by weight, more preferably between about 8% and 15% by weight, more preferably still between about 10% and 12% by weight, based on the weight of the polymeric stream and blowing agent. The particular blowing agent used (carbon dioxide, nitrogen, etc.) and the amount of blowing agent used is often dependent upon the polymer, the density reduction, cell size and physical properties desired.

The pressure and metering device can be connected to a controller (not shown) that also is connected to drive motor 40 to control metering of blowing agent in relationship to flow of polymeric material to very precisely control the weight percent blowing agent in the fluid polymeric mixture. For example, the mass flow rate of the blowing agent can be controlled so that it varies by no more than +/−0.3% in preferred cases.

Although port 54 can be located at any of a variety of locations along the barrel, according to a preferred embodiment it is located just upstream from a mixing section 60 of the screw and at a location 62 of the screw where the screw includes unbroken flights.

Figure 1A:
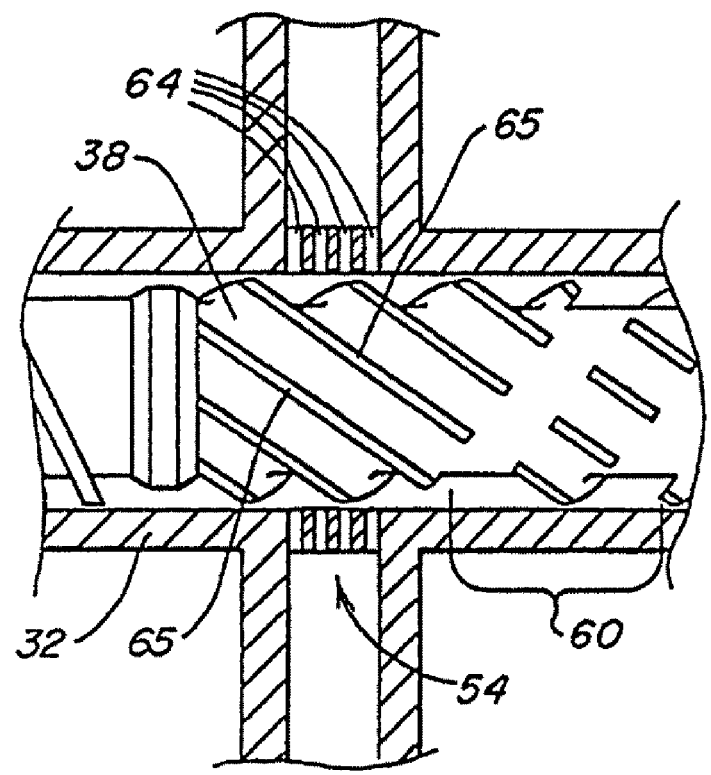
FIG. 1A illustrates a preferred multi-hole blowing agent feed orifice arrangement and extrusion screw in the system of FIG. 1.

Referring now to FIG. 1A, a preferred embodiment of the blowing agent port is illustrated in greater detail and, in addition, two ports on opposing top and bottom sides of the barrel are shown. In this preferred embodiment, port 54 is located at a region upstream from mixing section 60 of screw 38 (including highly-broken flights) at a distance upstream of the mixing section of no more than about 4 full flights, preferably no more than about 2 full flights, or no more than 1 full flight. Positioned as such, injected blowing agent is very rapidly and evenly mixed into a fluid polymeric stream to quickly produce a single-phase solution of the foamed material precursor and the blowing agent.

Port 54, in the preferred embodiment illustrated, is a multi-hole port including a plurality of orifices 64 connecting the blowing agent source with the extruder barrel. As shown, in preferred embodiments a plurality of ports 54 are provided about the extruder barrel at various positions radially and can be in alignment longitudinally with each other. For example, a plurality of ports 54 can be placed at the 12 o'clock, 3 o'clock, 6 o'clock, and 9 o'clock positions about the extruder barrel, each including multiple orifices 64. In this manner, where each orifice 64 is considered a blowing agent orifice, the invention includes extrusion apparatus having at least about 10, preferably at least about 40, more preferably at least about 100, more preferably at least about 300, more preferably at least about 500, and more preferably still at least about 700 blowing agent orifices in fluid communication with the extruder barrel, fluidly connecting the barrel with a source of blowing agent.

Also in preferred embodiments is an arrangement (as shown in FIG. 1A) in which the blowing agent orifice or orifices are positioned along the extruder barrel at a location where, when a preferred screw is mounted in the barrel, the orifice or orifices are adjacent full, unbroken flights 65. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices 54 are positioned at a distance of from about 15 to about 30 barrel diameters from the beginning of the screw (at upstream end 34).

The described arrangement facilitates a method of the invention that is practiced according to one set of embodiments. The method involves introducing, into fluid polymeric material flowing at a rate of at least about 40 lbs/hr., a blowing agent that is a gas under ambient conditions and, in a period of less than about 1 minute, creating a single-phase solution of the blowing agent fluid in the polymer. The blowing agent fluid is present in the solution in an amount of at least about 2.5% by weight based on the weight of the solution in this arrangement. In preferred embodiments, the rate of flow of the fluid polymeric material is at least about 60 lbs/hr., more preferably at least about 80 lbs/hr., and in a particularly preferred embodiment greater than at least about 100 lbs/hr., and the blowing agent fluid is added and a single-phase solution formed within one minute with blowing agent present in the solution in an amount of at least about 3% by weight, more preferably at least about 5% by weight, more preferably at least about 7%, and more preferably still at least about 10% (although, as mentioned, in a another set of preferred embodiments lower levels of blowing agent are used). In these arrangements, at least about 2.4 lbs per hour blowing agent, preferably $CO_2$, is introduced into the fluid stream and admixed therein to form a single-phase solution. The rate of introduction of blowing agent is matched with the rate of flow of polymer to achieve the optimum blowing agent concentration.

A supercritical fluid blowing agent also provides an advantage in that it facilitates the rapid, intimate mixing of dissimilar polymeric materials, thereby providing a method for mixing and molding dissimilar polymeric materials without post-mold delamination. Dissimilar materials include, for example, polystyrene and polypropylene, or polystyrene and polyethylene. These dissimilar materials typically have significantly different viscosity, polarity, or chemical functionality that, in most systems, precludes formation of a well-mixed, homogeneous combination, leading to delamination or other physical property reduction or physical property degradation. Preferably, in this embodiment, at least two dissimilar components are present with the minority component in an amount of at least about 1% by weight, preferably at least about 5%, more preferably at least about 10%, more preferably still at least about 20%.

Typical prior art techniques for forming combinations of dissimilar polymeric materials involves extruding and pelletizing dissimilar polymeric materials which then are provided, as pellets, in hopper 44 of a system such as that of FIG. 1. Using a supercritical fluid blowing agent, in accordance with this aspect of the invention, eliminates the necessity for using pre-mixed pellets or compounding equipment. In this aspect, a mixture of different polymer pellets, for example a mixture of polystyrene pellets and polypropylene pellets, can be provided in hopper 44, melted, intimately mixed with a supercritical fluid blowing agent, and extruded as a well-mixed homogeneous mixture. In this aspect of the invention a single-phase solution of blowing agent and multi-component polymeric material, including dissimilar materials, can be formed at flow rates and within time periods specified below. This aspect of the invention can be used to form polymeric articles composed of at least two dissimilar polymeric materials that resist delamination via extrusion, molding as described herein, or other techniques.

The described arrangement facilitates a method that is practiced according to several embodiments of the invention, in combination with injection or intrusion molding. The method involves introducing, into fluid polymeric material flowing at a rate of from about 0.4 to about 1.4 lbs/hr., a blowing agent that is a gas under ambient conditions and, in a period of less than about 1 minute, creating a single-phase solution of the blowing agent fluid in the polymer. The blowing agent fluid is present in the solution in an amount of at least about 2.5% by weight based on the weight of the solution in this arrangement. In some embodiments, the rate of flow of the fluid polymeric material is from about 6 to 12 lbs/hr. In these arrangements, the blowing agent fluid is added and a single-phase solution formed within one minute with blowing agent present in the solution in an amount of at least about 3% by weight, more preferably at least about 5% by weight, more preferably at least about 7%, and more preferably still at least about 10% (although, as mentioned, in a another set of preferred embodiments lower levels of blowing agent are used). In these arrangements, at least about 2.4 lbs per hour blowing agent, preferably $CO_2$, is introduced into the fluid stream and admixed therein to form a single-phase solution. The rate of introduction of blowing agent is matched with the rate of flow of polymer to achieve the optimum blowing agent concentration.

Downstream of region 50 is a nucleator 66 constructed to include a pressure-drop nucleating pathway 67. As used herein, "nucleating pathway" in the context of rapid pressure drop is meant to define a pathway that forms part of microcellular polymer foam extrusion apparatus and in which, under conditions in which the apparatus is designed to operate (typically at pressures of from about 1500 to about 30,000 psi upstream of the nucleator and at flow rates of greater than about 5 lbs polymeric material per hour), the pressure of a single-phase solution of polymeric material admixed with blowing agent in the system drops below the saturation pressure for the particular blowing agent concentration at a rate or rates facilitating nucleation. Nucleating pathway 67 includes an inlet end 69 for receiving a single-phase solution of polymeric material precursor and blowing agent as a fluid polymeric stream, and a nucleated polymer releasing end 70 for delivering nucleated polymeric material to molding chamber, or mold, 37. Nucleator 66 can be located in a variety of locations downstream of region 50 and upstream of mold 37. In a preferred embodiment, nucleator 66 is located in direct fluid communication with mold 37, such that the nucleator defines a nozzle connecting the extruder to the molding chamber and the nucleated polymer releasing end 70 defines an orifice of molding chamber 37. According to one set of embodiments, the invention lies in placing a nucleator upstream of a mold. Although not illustrated, another embodiment of nucleator 66 includes a nucleating pathway 67 constructed and arranged to have a variable cross-sectional dimension, that is, a pathway that can be adjusted in cross-section. A variable cross-section nucleating pathway allows the pressure drop rate in a stream of fluid polymeric material passing therethrough to be varied in order to achieve a desired nucleation density.

In one embodiment, a nucleating pathway that changes in cross-sectional dimension along its length is used. In particular, a nucleating pathway that decreases in cross-sectional dimension in a downstream direction can significantly increase pressure drop rate thereby allowing formation of microcellular material of very high cell density using relatively low levels of blowing agent. These and other exemplary and preferred nucleators are described in co-pending U.S. patent application Ser. No. 08/777,709 entitled "Method and Apparatus for Microcellular Extrusion" and International patent application serial no. PCT/US97/15088, entitled "Method and Apparatus for Microcellular Polymer Extrusion" of Anderson, et al., both referenced above.

While pathway 67 defines a nucleating pathway, some nucleation also may take place in the mold itself as pressure on the polymeric material drops at a very high rate during filling of the mold.

The system of FIG. 1 illustrates one general embodiment of the present invention in which a single-phase, non-nucleated solution of polymeric material and blowing agent is nucleated, via rapid pressure drop, while being urged into molding chamber 37 via the rotation action of screw 38. This embodiment illustrates an intrusion molding technique and, in this embodiment, only one blowing agent injection port 54 need be utilized.

In another embodiment, screw 38 of system 30 is a reciprocating screw and a system defines an injection molding system. In this embodiment screw 38 is mounted for reciprocation within barrel 32, and includes a plurality of blowing agent inlets or injection ports 54, 55, 57, 59, and 61 arranged axially along barrel 32 and each connecting barrel 32 fluidly to pressure and metering device 58 and a blowing agent source 56. Each of injection ports 54, 55, 57, 59, and 61 can include a mechanical shut-off valve 154, 155, 157, 159, and 161 respectively, which allow the flow of blowing agent into extruder barrel 38 to be controlled as a function of axial position of reciprocating screw 38 within the barrel. In operation, according to this embodiment, a charge of fluid polymeric material and blowing agent (which can be a single-phase, non-nucleated charge in some embodiments) is accumulated in region 50 downstream of the downstream end 48 of screw 38. Screw 38 is forced distally (downstream) in barrel 32 causing the charge in region 50 to be injected into mold 37. A mechanical shut-off valve 64, located near orifice 70 of mold 37, then can be closed and mold 37 can be opened to release an injection-molded part. Screw 38 then rotates while retracting proximally (toward the upstream end 34 of the barrel), and shut-off valve 161 is opened while shut-off valves 155, 157, 154, and 159 all are closed, allowing blowing agent to be injected into the barrel through distal-most port 61 only. As the barrel retracts while rotating, shut-off valve 161 is closed while shut-off valve 159 is opened, then valve 159 is closed while valve 154 is opened, etc. That is, the shut-off valves which control injection of blowing agent from source 56 into barrel 32 are controlled so that the location of injection of blowing agent moves proximally (in an upstream direction) along the barrel as screw 38 retracts proximally. The result is injection of blowing agent at a position along screw 38 that remains essentially constant. Thus, blowing agent is added to fluid polymeric material and mixed with the polymeric material to a degree and for a period of time that is consistent independent of the position of screw 38 within the barrel. Toward this end, more than one of shut-off valves 155, 157, etc. can be open or at least partially open simultaneously to achieve smooth transition between injection ports that are open and to maintain essentially constant location of injection of blowing agent along barrel 38.

Once barrel 38 is fully retracted (with blowing agent having been most recently introduced through injection port 55 only), all of the blowing agent shut-off valves are closed. At this point, within distal region 50 of the barrel is an essentially uniform fluid polymeric material/blowing agent mixture.

Shut-off valve 64 then is opened and screw 38 is urged distally to inject the charge of polymeric material and blowing agent into mold 37.

The embodiment of the invention involving a reciprocating screw can be used to produce non-microcellular foams or microcellular foam. Where non-microcellular foam is to be produced, the charge that is accumulated in distal region 50 can be a multi-phase mixture including cells of blowing agent in polymeric material, at a relatively low pressure. Injection of such a mixture into mold 37 results in cell growth and production of conventional foam. Where microcellular material is to be produced, a single-phase, non-nucleated solution is accumulated in region 50 and is injected into mold 37 while nucleation takes place.

The described arrangement facilitates a method of the invention that is practiced according to another set of embodiments in which varying concentrations of blowing agent in fluid polymeric material is created at different locations in a charge accumulated in distal portion 50 of the barrel. This can be achieved by control of shut-off valves 155, 157, 154, 159, and 161 in order to achieve non-uniform blowing agent concentration. In this technique, articles having varying densities may be produced, such as, for example, an article having a solid exterior and a foamed interior. One technique for forming articles having portions that vary in density is described more fully below with reference to FIGS. 5-7.

Although not shown, molding chamber 37 can include vents to allow air within the mold to escape during injection. The vents can be sized to provide sufficient back pressure during injection to control cell growth so that uniform microcellular foaming occurs. In another embodiment, a single-phase, non-nucleated solution of polymeric material and blowing agent is nucleated while being introduced into an open mold, then the mold is closed to shape a microcellular article.

Figure 2:
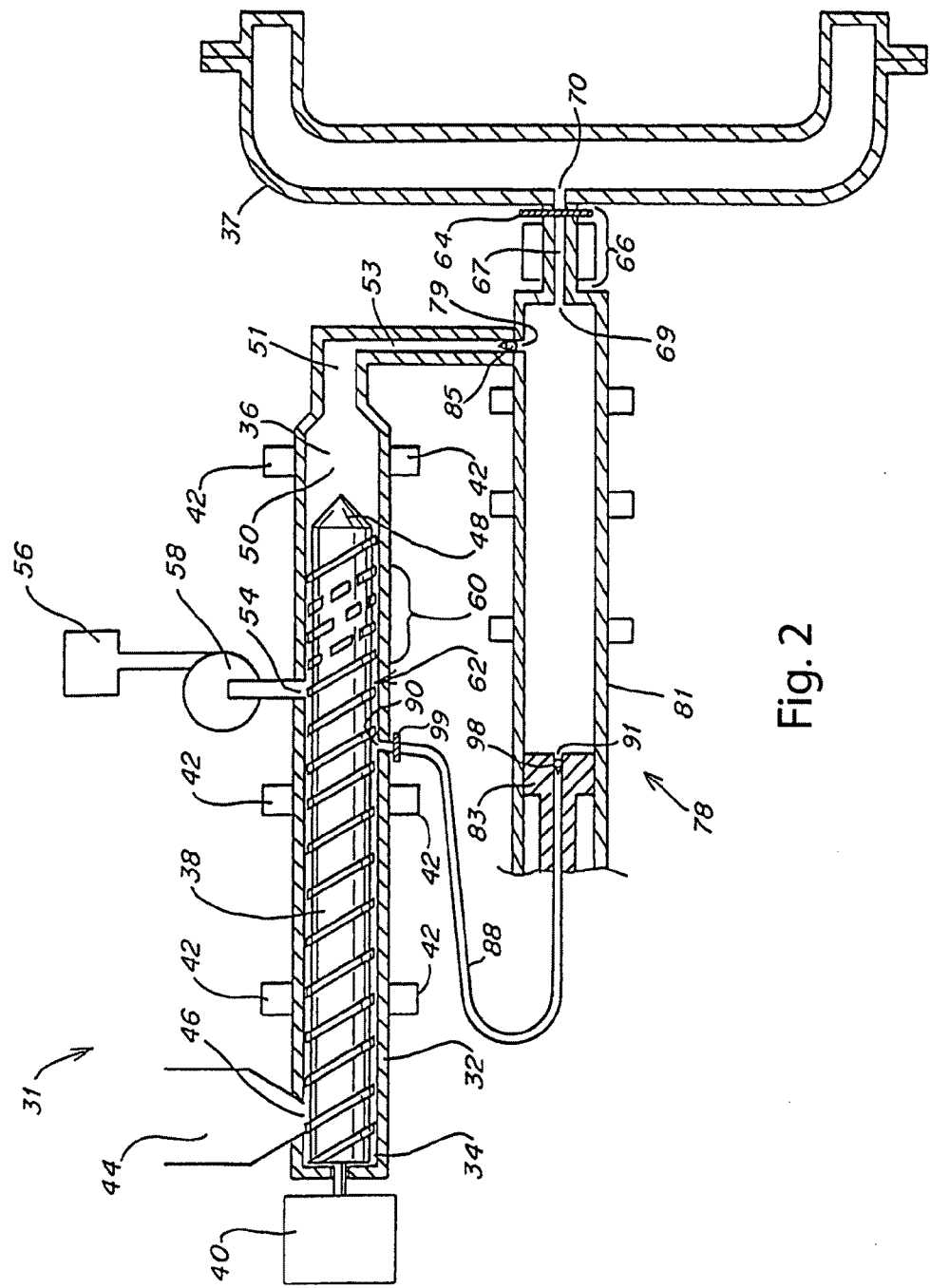
FIG. 2 illustrates a microcellular injection molding system of the invention including an accumulator.

According to another embodiment an injection molding system utilizing a separate accumulator is provided. Referring now to FIG. 2, an injection molding system 31 includes an extruder similar to that illustrated in FIG. 1. The extruder can include a reciprocating screw as in the system of FIG. 1. At least one accumulator 78 is provided for accumulating molten polymeric material prior to injection into molding chamber 37. The extruder includes an outlet 51 fluidly connected to an inlet 79 of the accumulator via a conduit 53 for delivering a non-nucleated, single-phase solution of polymeric material and blowing agent to the accumulator.

Accumulator 78 includes, within a housing 81, a plunger 83 constructed and arranged to move axially (proximally and distally) within the accumulator housing. The plunger can retract proximally and allow the accumulator to be filled with polymeric material/blowing agent through inlet 79 and then can be urged distally to force the polymeric material/blowing agent mixture into mold 37. When in a retracted position, a charge defined by single-phase solution of molten polymeric material and blowing agent is allowed to accumulate in accumulator 78. When accumulator 78 is full, a system such as, for example, a hydraulically controlled retractable injection cylinder (not shown) forces the accumulated charge through nucleator 66 and the resulting nucleated mixture into molding chamber 37. This arrangement illustrates another embodiment in which a non-nucleated, single-phase solution of polymeric material and blowing agent is nucleated as a result of the process of filling the molding chamber. Alternatively, a pressure drop nucleator can be positioned downstream of region 50 and upstream of accumulator 78, so that nucleated polymeric material is accumulated, rather than non-nucleated material, which then is injected into mold 37.

In another arrangement, a reciprocating screw extruder such as that illustrated in FIG. 1 can be used with system 31 of FIG. 2 so as to successively inject charges of polymeric material and blowing agent (which can remain non-nucleated or can be nucleated while being urged from the extruder into the accumulator) while pressure on plunger 83 remains high enough so that nucleation is prevented within the accumulator (or, if nucleated material is provided in the accumulator cell growth is prevented). When a plurality of charges have been introduced into the accumulator, shut-off valve 64 can be opened and plunger 83 driven distally to transfer the charge within the accumulator into mold 37. This can be advantageous for production of very large parts.

A ball check valve 85 is located near the inlet 79 of the accumulator to regulate the flow of material into the accumulator and to prevent backflow into the extruder, and to maintain a system pressure required to maintain the single-phase solution of non-nucleated blowing agent and molten polymeric material or, alternatively, to prevent cell growth of nucleated material introduced therein. Optionally, injection molding system 31 can include more than one accumulator in fluid communication with extruder 30 and molding chamber 37 in order to increase rates of production.

System 31 includes several additional components that will be described more fully below.

Figure 3:
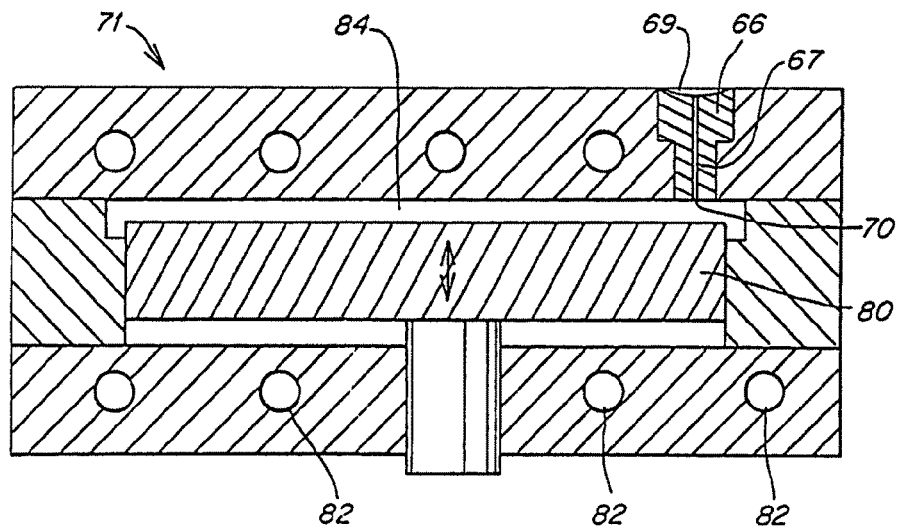
FIG. 3 illustrates one embodiment of a molding chamber of molding systems of the invention, including a movable wall.
Figure 4:
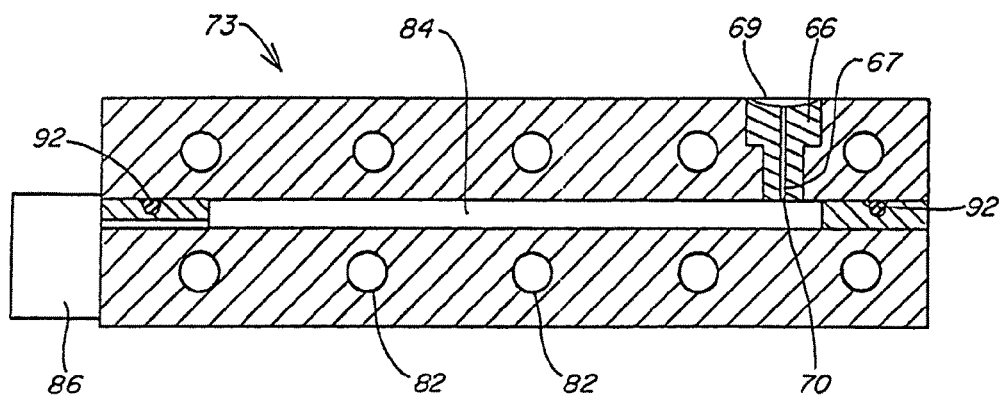
FIG. 4 illustrates another embodiment of a molding chamber, where the molding chamber is a gas-pressurized mold.

FIGS. 3 and 4 illustrate molding chambers according to alternative embodiments for use with injection molding systems of the invention. In FIG. 3, a movable wall molding chamber 71 is illustrated schematically, including mold cavity 84, temperature control elements 82, moveable wall 80, pressurizing means (not shown) and in the preferred embodiment illustrated, at least one nucleator 66 including a nucleating pathway 67 having an inlet end 69 and an releasing end 70 which defines an orifice of mold cavity 84. In one embodiment, movable wall molding chamber 71 includes a plurality of nucleators 66. Movable wall 80 can be adjusted to increase the volume of the mold as the mold is filled with a nucleated mixture of polymeric precursor and blowing agent, thus maintaining a constant pressure within the mold. In this way, cell growth can be restricted, or controlled, appropriately.

In FIG. 4, a gas counter-pressure molding chamber 73 is illustrated schematically, including mold cavity 84, temperature control elements 82, pressure controller 86, seals 92, and in the preferred embodiment illustrated, at least one nucleator 66 including a nucleating pathway 67 including defining an orifice of the molding chamber 73. As described previously, the nucleating pathway 67 has an inlet end 69 and an releasing end 70 which defines an orifice of chamber 84. The pressure within the mold can be maintained, via pressure controller 86, to restrict or control cell growth in the nucleated mixture introduced into the mold.

Any combination of a movable-wall mold, a mold having a gas pressure controller, and temperature control elements in a mold can be used for a variety of purposes. As discussed, conditions can be controlled so as to restrict or control cell growth in a nucleated mixture within the mold. Another use for temperature control measurements is that a portion of the mold wall, or the entire mold wall, can be maintained at a relatively high or relatively low temperature, which can cause relatively greater or lesser cell growth at regions near the wall (regions at and near the skin of the microcellular mold and product) relative to regions near the center of the article formed in the mold.

In one embodiment of the invention, relatively thick microcellular polymeric material is molded, for example material including at least one portion have a thickness of at least 0.500 inch by establishing a nucleated, microcellular polymeric precursor in a mold and rapidly "cracking", or opening the mold to allow a part larger than the interior of the closed mold itself to form. When the mold is cracked, cell growth occurs due to a corresponding pressure drop. The nucleated mixture is allowed to partially solidify in the shape of the mold, or enclosure, to form a first microcellular polymeric article in the shape of the enclosure, is removed from the enclosure, and allowed to expand further to form a second microcellular polymeric article having a shape that is larger than the shape of the enclosure. In some aspects, the injection or protrusion may continue after cracking of the mold, to control density and cell structure. That is, a solution can be introduced into the mold while being nucleated and, simultaneously, the mold can be cracked and then further opened to control back pressure in the mold and to control the size of the final part and cell density and structure. This can be accomplished, as well, with an analogous moveable wall mold, described herein.

The invention allows for rapid, cyclic, polymeric foam molding. After injection and molding, in a period of less than about 10 minutes, a second nucleated mixture can be created by injection into the molding chamber and allowed to foam and solidify in the shape of the enclosure, and to be removed. Preferably, the cycle time is less than about one minute, more preferably less than about 20 seconds. The time between introduction of the material into the mold and solidification is typically less than about 10 seconds. Low cycle times are provided due to reduced weight in foam material (less mass to cool) and low melt temperatures made possible by reduced viscosity of a supercritical fluid blowing agent. With lower melt temperatures less heat absorption is required before part ejection.

Figure 5:
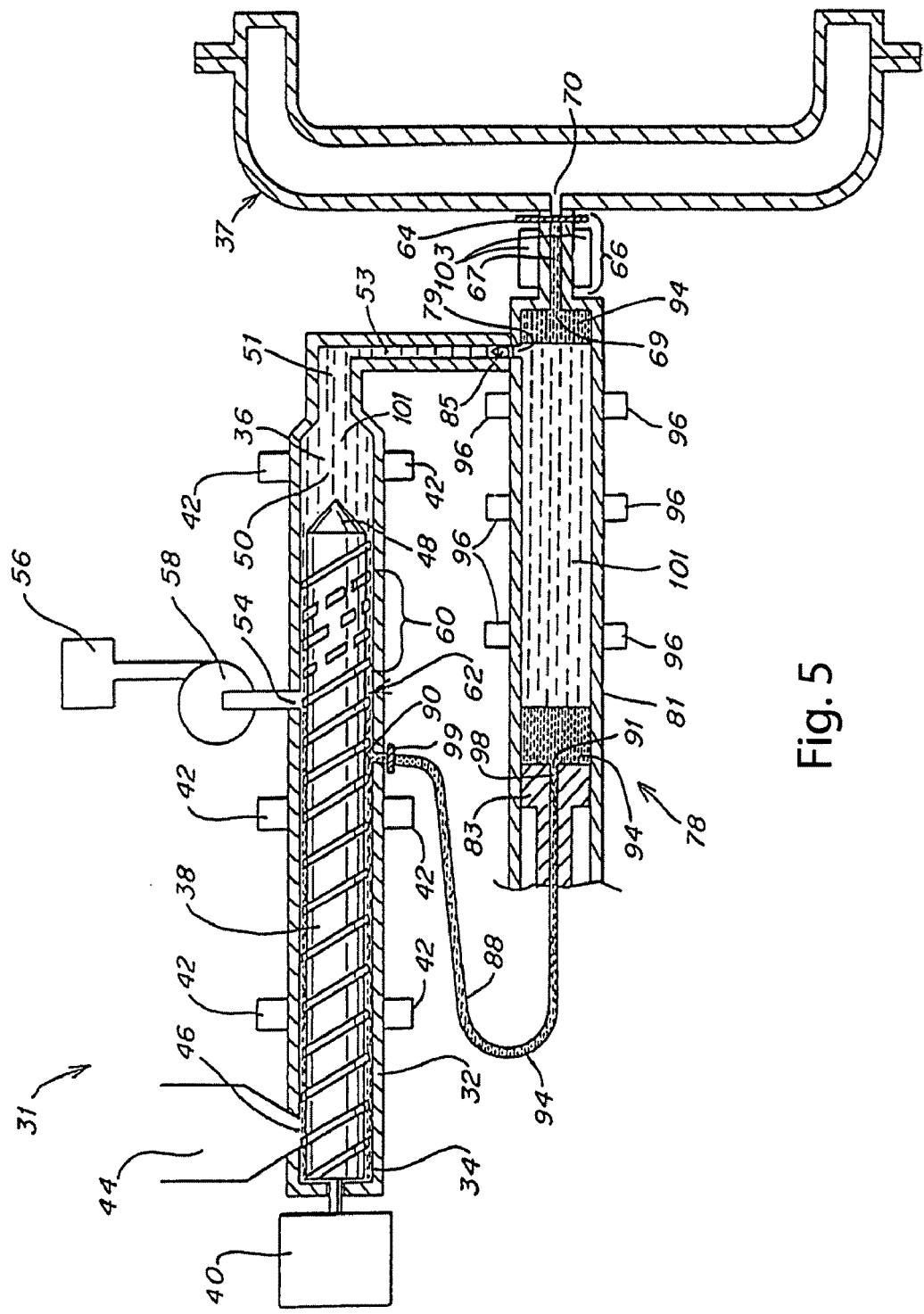
FIG. 5 illustrates one stage of operation of a system for accumulation and injection molding of microcellular material to form an article having a solid wall and a microcellular interior (blowing agent-rich and blowing agent-poor regions), in which an accumulator is filled prior to injection.
Figure 6:
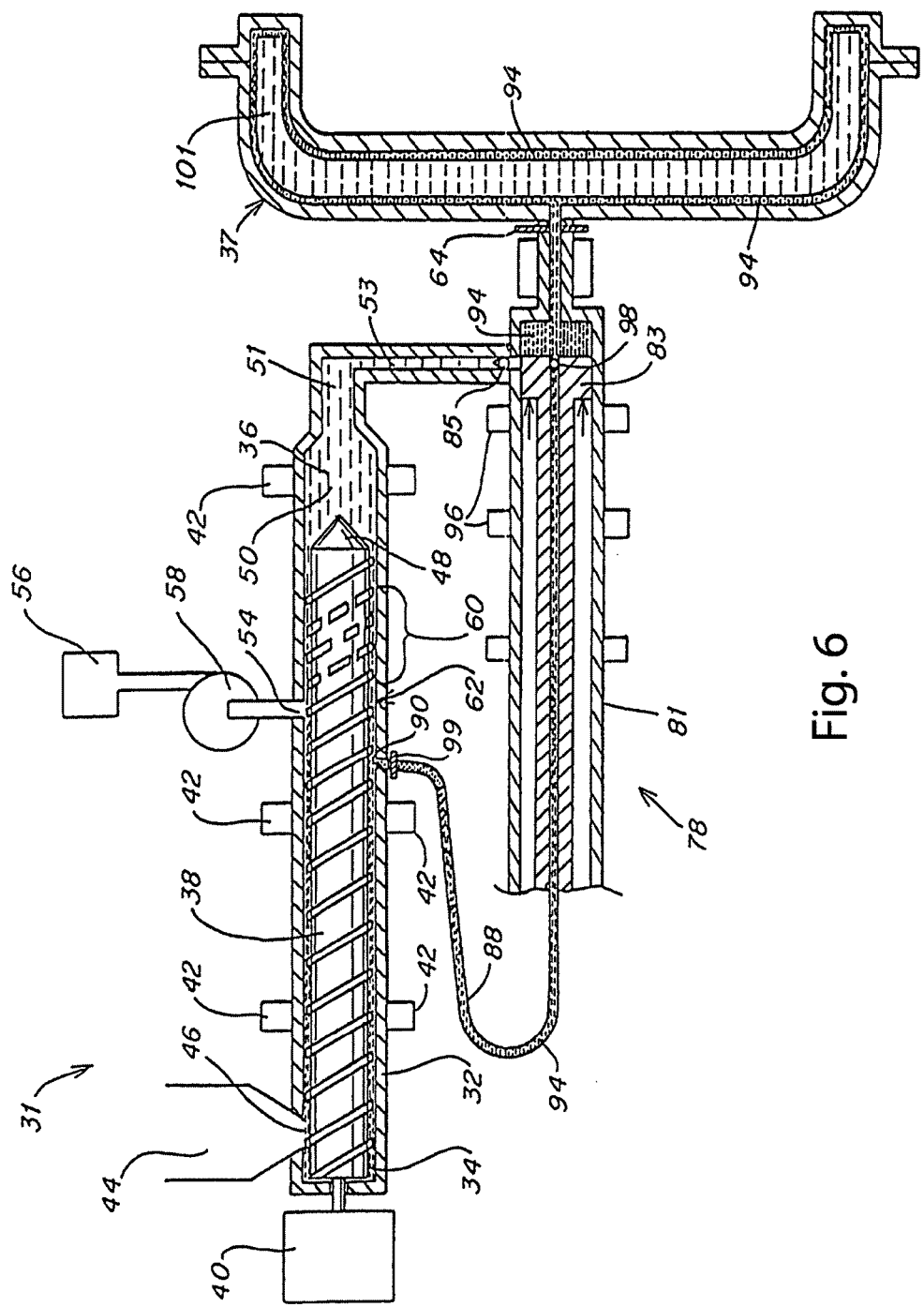
FIG. 6 illustrates the system of FIG. 5 at a stage of operation immediately after injection.
Figure 7:
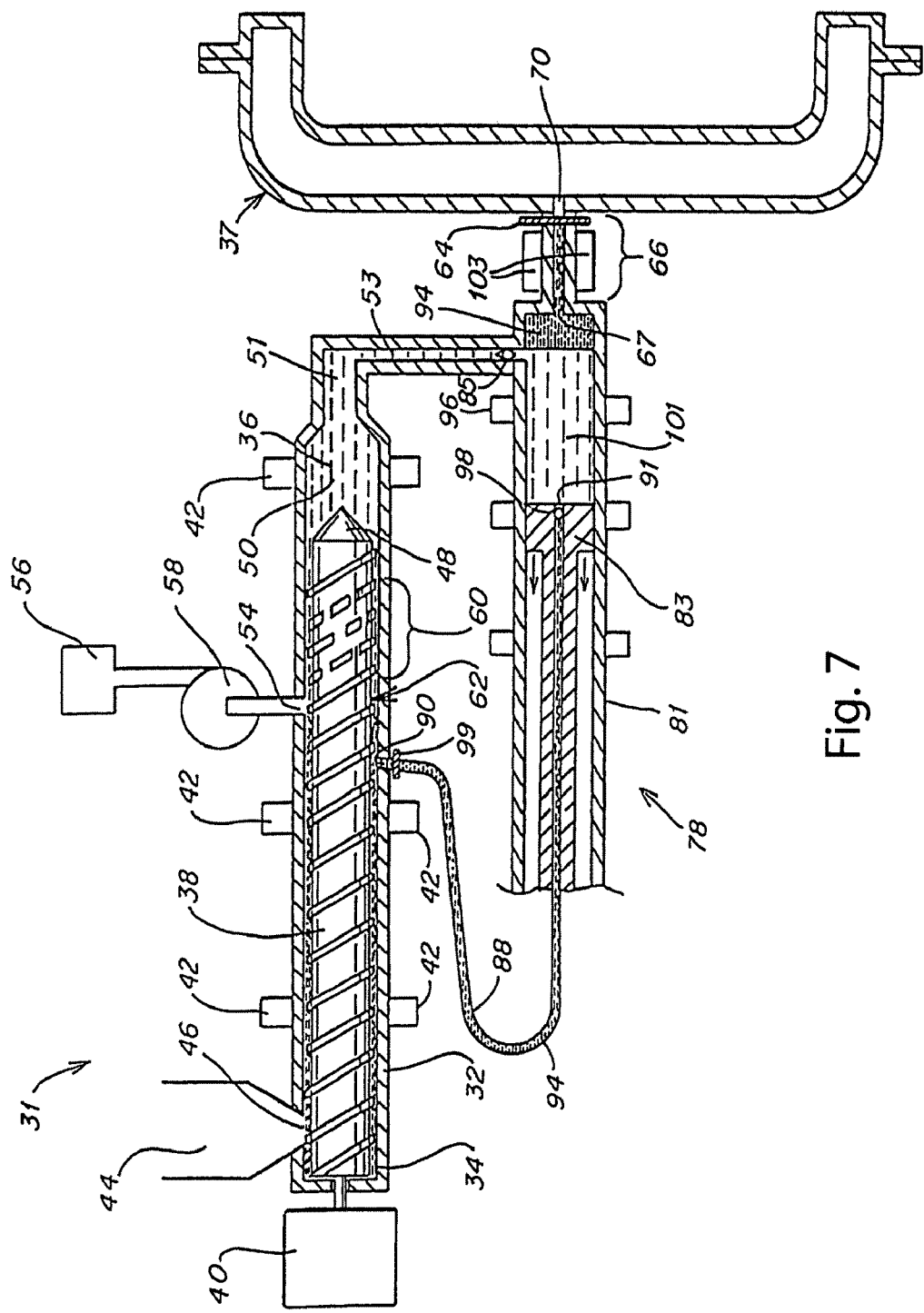
FIG. 7 illustrates the system of FIG. 5 at a stage of operation after one injection cycle, during filling of the accumulator.

Referring now to FIGS. 5-7, another embodiment of the invention that makes use of system 31 is illustrated, and system 31 now will be described more fully. System 31 also includes a blowing agent-free conduit 88 connecting an outlet 90 of the extruder with an accumulator inlet 91. Inlet 91 of the accumulator is positioned at the face of plunger 83 of the accumulator. A mechanical shut-off valve 99 is positioned along conduit 88, preferably near outlet 90. Extruder outlet 90 is located in the extruder upstream of blowing agent inlet 54 (or multiple blowing agent inlets, as in the extrusion arrangement illustrated in FIG. 1, where that arrangement is used in the system as described in FIGS. 5-7) but far enough downstream in the extruder that it can deliver fluid polymeric material 94. The fluid polymeric material 94 delivered by conduit 88 is blowing-agent-poor material, and can be essentially free of blowing agent. Thus, the system includes a first outlet 90 of the extruder positioned to deliver fluid polymeric material essentially free of blowing agent, or at reduced blowing agent concentration, from the extruder to a first inlet 91 of the accumulator, and a second outlet 51 downstream of the mixing region of the extruder positioned to deliver a mixture of fluid polymeric material and blowing agent (a higher blowing agent concentration than is delivered from outlet 90, i.e. blowing-agent-rich material) to a second inlet 79 of the accumulator. The accumulator can include heating units 96 to control the temperature of polymeric material therein. The accumulator includes an outlet that is the inlet 69 of nucleator 66. A passage (or nozzle) defining nucleating pathway 67 connects accumulator 78 to the molding chamber 37.

A series of valves, including ball check valves 98 and 85 located at the first and second inlets to the accumulator, and mechanical valves 64 and 99, respectively, control flow of material from the extruder to the accumulator and from the accumulator to the mold as desired, as described below according to some embodiments.

The invention involves, in all embodiments, the ability to maintain pressure throughout the system adequate to prevent premature nucleation where nucleation is not desirable (upstream of the nucleator), or cell growth where nucleation has occurred but cell growth is not desired or is desirably controlled.

Practicing the method according to one embodiment of the present invention involves injecting blowing agent-poor material into a mold to form a nearly solid skin, followed by injecting blowing agent-rich material into the mold to form a foamed core. This will be described with reference to FIGS. 5-7. Although not illustrated, with proper synchronization this method can also be used to form articles having a foamed exterior and a solid interior.

FIG. 5 illustrates a situation in which polymeric material that does not contain blowing agent, or contains blowing agent only to a limited extent (material 94) is provided both at the distal end of the accumulator and the proximal end of the accumulator. That is, blowing agent-poor material 94 is provided just in front of plunger 83 and in nucleating pathway 67 and just upstream of nucleating pathway 67. Between these regions of blowing agent-poor material 94 is a region of blowing agent-rich material 101 in the accumulator. At this point, mechanical valve 64 connecting to mold 37 is opened and plunger 83 is driven downstream to force the material in accumulator 78 into mold 37. This is illustrated in FIG. 6. The first section of blowing agent-poor material lines the exterior of the mold, forming an essentially solid exterior wall, then the blowing agent-rich material 101 fills the center of the mold and is nucleated while entering the mold. The distal limit of motion of the plunger stops short of the end of accumulator and the region of blowing agent-poor material that had been located just in front of the plunger is now positioned at the distal end of the accumulator and filling the nucleating pathway of the accumulator. Valve 64 then is closed and the resultant part is removed from mold 37. With mechanical valve 99 closed, the extruder is driven to introduce blowing agent-rich material, preferably as a single-phase, non-nucleated solution of polymeric material and blowing agent, into the accumulator as the plunger retracts proximally, as illustrated in FIG. 7. The plunger applies an essentially constant pressure to material in the accumulator, maintaining material 101 in a non-nucleated state. When the plunger has reached nearly its proximal limit, mechanical valve 99 is opened and blowing agent-poor material 94 is allowed to fill a section of the accumulator just in front of the plunger, as illustrated in FIG. 5. FIG. 5 represents the completion of the cycle, just before injection into the mold.

In another embodiment of the invention, with reference to FIGS. 5-7, an injection-molded microcellular article having a blowing agent-poor exterior wall and a blowing agent-rich, microcellular foamed interior can be formed without the necessity of filling accumulator 78 with blowing agent-rich material sandwiched between blowing agent-poor material, as illustrated. In this embodiment blowing agent-rich material fills the mold but the distal-most part of the accumulator, defined by the nucleating pathway 67, is heated to a greater extent than is the remainder of the accumulator. This can be accomplished using heating units 103 positioned adjacent the nucleator. If needed, additional heating units can be provided to heat material in the accumulator upstream of the nucleating pathway. Material in the distal-most portion of the accumulator is heated to a great enough extent that, when the charge in the accumulator is injected into the mold, blowing agent in the highly-heated section very quickly diffuses out of the polymer and through vents (not shown) in the mold. In the polymeric material upstream of the distal-most, more highly-heated charge section, cell growth occurs to form microcellular material faster than blowing agent can diffuse out of the polymer. The distal most portion of the charge that is heated can define at least about 2% of the charge, or at least about 5%, or at least about 10%, or at least about 20% of the charge, and can be heated to a temperature at least about 10° C. higher than the average temperature of the charge, or at least about 20° C., 40° C., or 80° C. higher than the average temperature of the charge, prior to injecting the charge into a molding chamber.

In another embodiment of the invention a single-phase, homogeneous solution of polymeric material and blowing agent can be injected into a mold while maintaining pressure in the mold high enough to prevent nucleation. That is, injection occurs without nucleation. The homogeneous, single-phase solution then can be frozen into a solid state in the mold, and the mold opened. At this point nucleation and foaming do not occur. The molded article then can be heated to cause nucleation and foaming, for example by placement in a glycerine bath.

A variety of articles can be produced according to the invention, for example, consumer goods and industrial goods such as polymeric cutlery, automotive components, and a wide variety of other injection molded parts.

Figure 8:
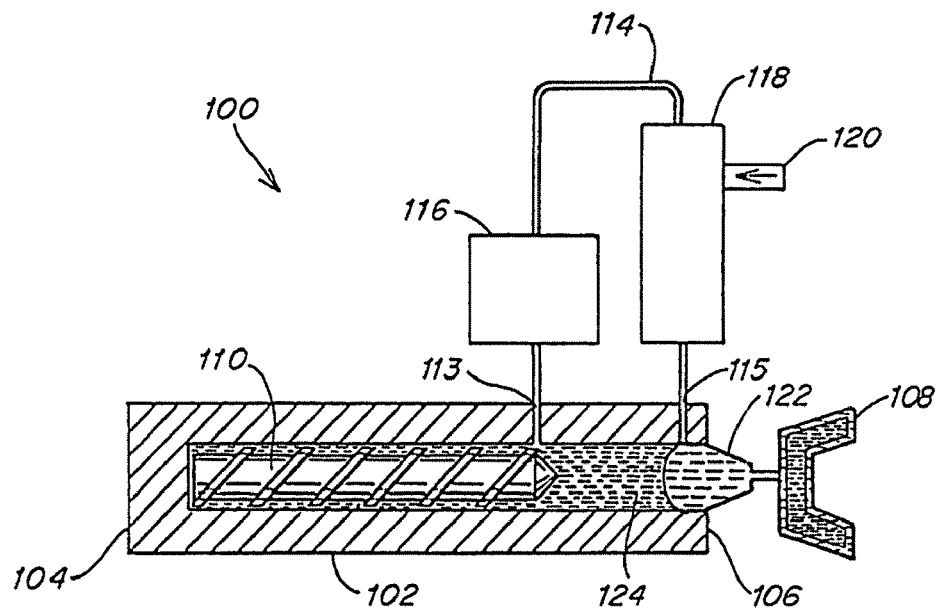
FIG. 8 illustrates a microcellular injection molding system for forming blowing agent-rich and blowing agent-poor regions of molten polymer, including a melt pump, a gas injection port, and a mixer.

FIG. 8 illustrates schematically an injection molding system 100 according to another embodiment of the invention. Injection molding system 100 includes an extruder that can be similar to that illustrated in FIG. 1, including a barrel 102 having a first, upstream end 104 and a second, downstream end 106 connected to a molding chamber 108. Mounted for reciprocation and rotation within barrel 102 is a screw 110 operably connected, at its upstream end, to a drive motor (not illustrated). A sidestream 114, connecting an intake 113 and a port 115 of the barrel, the port downstream of the intake, includes a melt pump 116 and mixer 118 fluidly connected in sequence. Melt pump 116 can be a gear pump or a small extruder, which are known in the art.

Mixer 118 includes a blowing agent injection port 120 for introducing a blowing agent therein. Mixer 118 can be a static mixer or a cavity transfer mixer, which are also known in the art. The arrangement illustrated in FIG. 8 facilitates another method of the invention that is useful for forming injection molded microcellular parts having varying material densities, as described previously. The method involves introducing into extruder barrel 102 a precursor of polymeric material, melting the precursor of polymeric material, and advancing molten polymeric material 124 towards the downstream end 106 of extruder 100. As the molten polymeric material 124 advances through extruder barrel 102, a portion is diverted and advanced through intake 113 into sidestream 114 by melt pump 116 (for example, after the distal end of screw 110 is retracted proximally of intake 113 of side arm 114). As the molten polymeric material in sidestream 114 advances through mixer 118, blowing agent from gas injection port 120 is introduced and mixed thoroughly therein to form a single-phase, non-nucleated solution of blowing agent and molten polymeric material which is advanced from sidestream 114 into the downstream end 106 of extruder barrel 102 through port 115, as illustrated in FIG. 8, while reciprocating screw 110 fully retracts. This creates a blowing agent-rich region 122 at the distal most end of the barrel and a blowing agent-poor region proximal of the blowing agent-rich region. The relative amount of blowing agent-rich material and a blowing agent-poor material can be controlled by the rate at which material is passed through side arm 14 and enriched with blowing agent. Thereafter, the reciprocating action of screw 110 is used to inject the blowing agent-rich, single-phase solution of non-nucleated blowing agent and molten polymeric material 122 followed by a portion of the blowing agent-poor molten polymeric material 124 into molding chamber 108.

Figure 9:
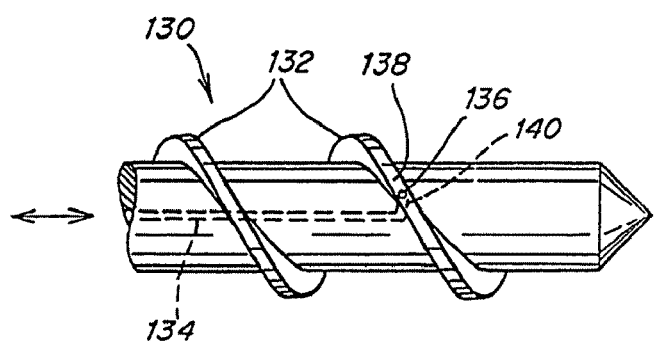
FIG. 9 illustrates a helical screw for use in an injection molding system or other extrusion system, including a lumen that passes through a screw flight and is in fluid communication with a source of foaming agent for distributing a foaming agent in a barrel of an extruder.
Figure 10:
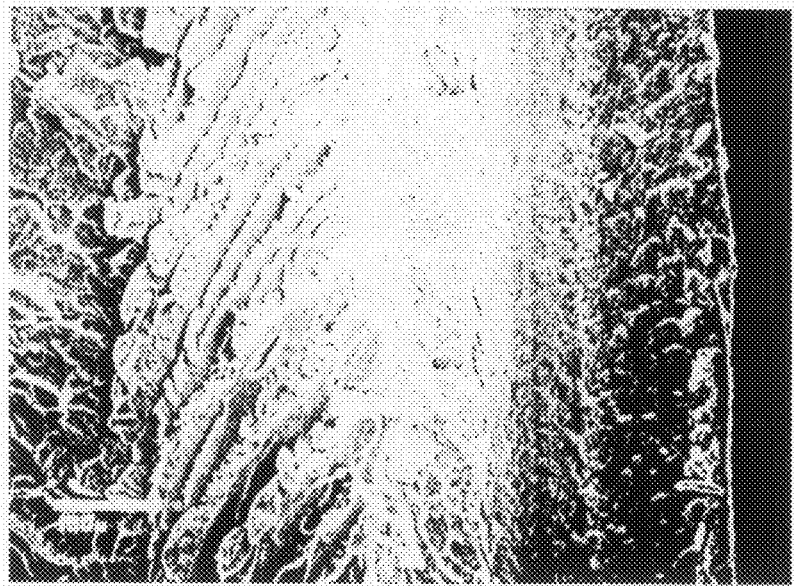
FIG. 10 is a photocopy of a photomicrograph of an injected molded article formed using systems and methods of the present invention.
Figure 11:
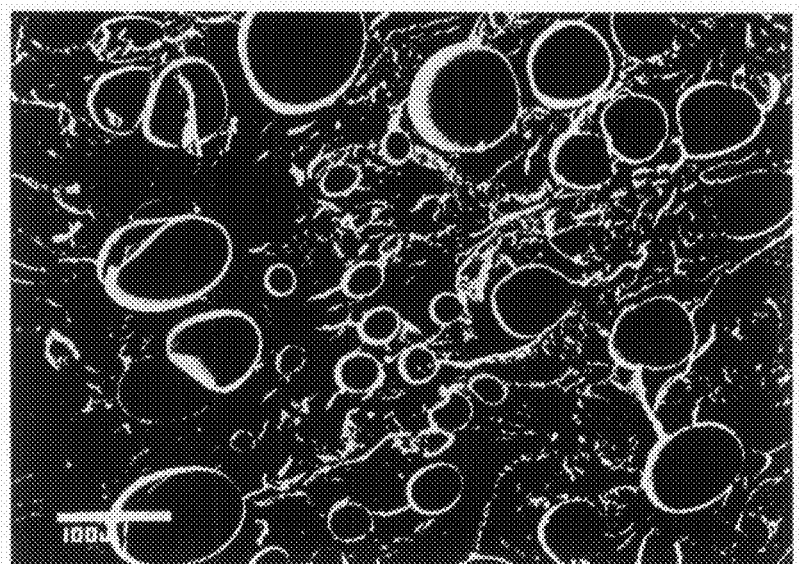
FIG. 11 is a photocopy of a photomicrograph of a microcellular injection molded article of the invention.
Figure 12:
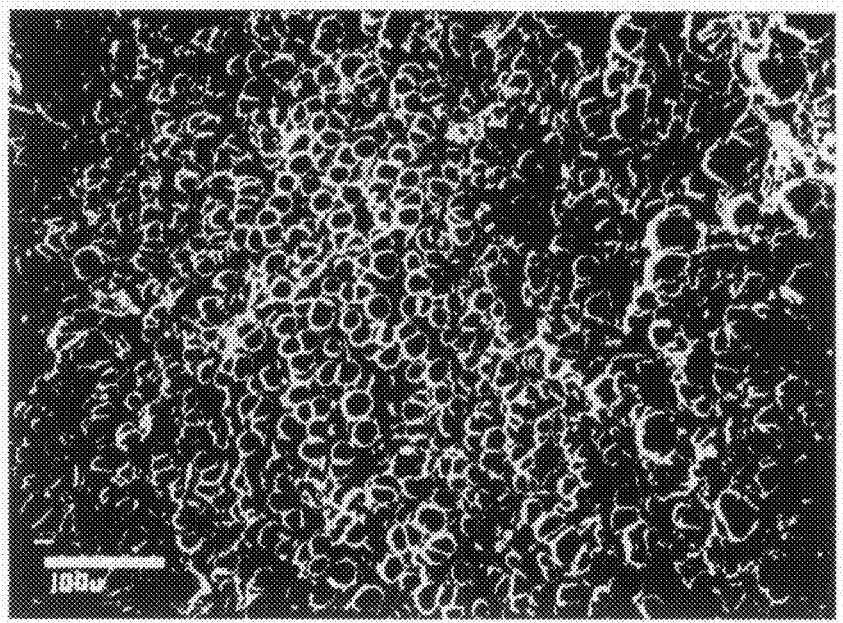
FIG. 12 is a photocopy of a photomicrograph of another microcellular injection molded article of the invention.
Figure 13:
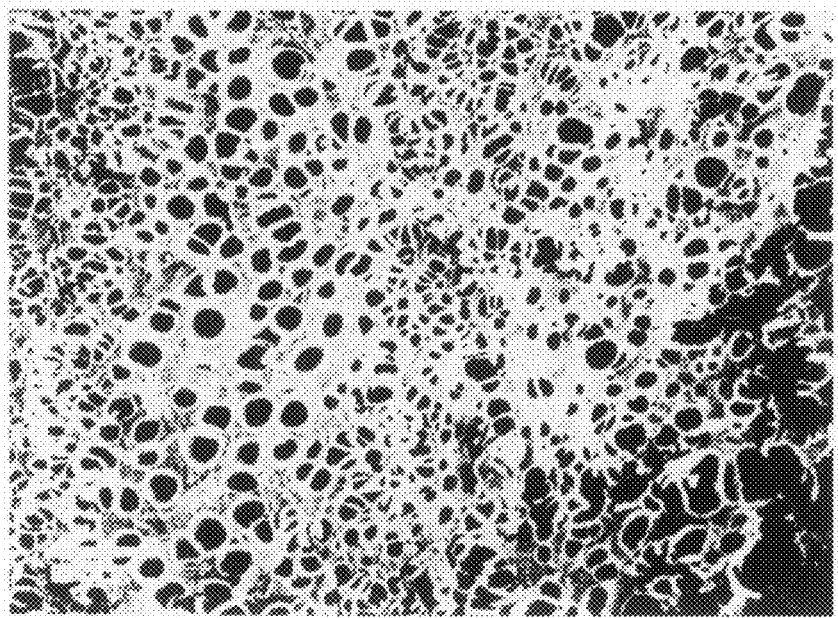
FIG. 13 is a photocopy of a photomicrograph of another microcellular injection molded article of the invention.
Figure 14:
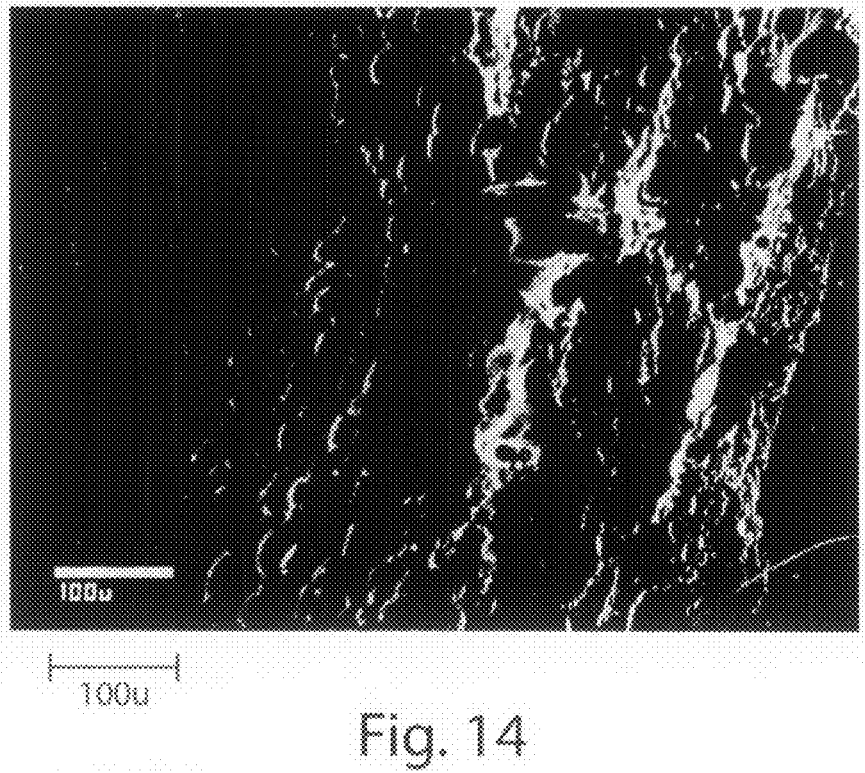
FIG. 14 is a photocopy of a photomicrograph of another microcellular injection molded article of the invention.
Figure 15:
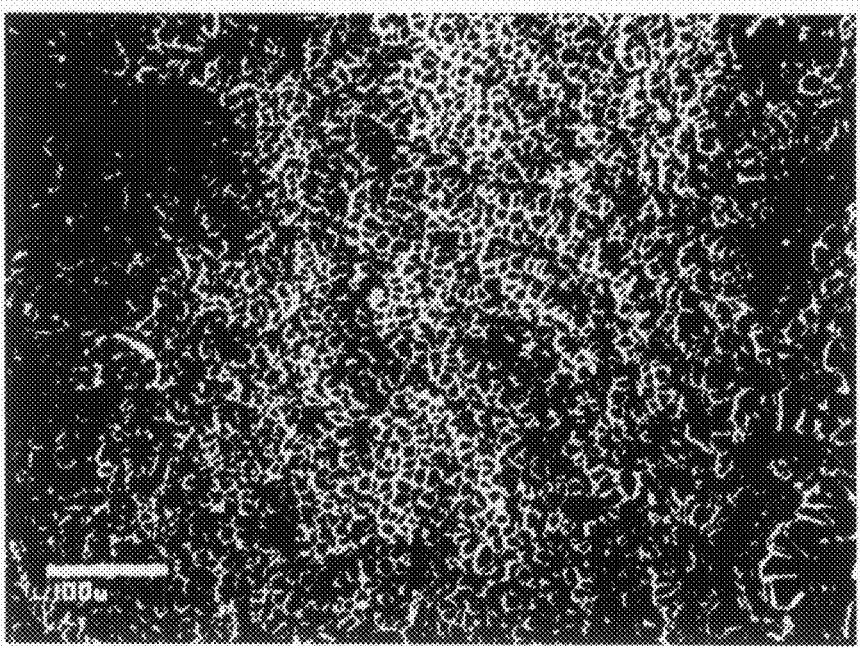
FIG. 15 is a photocopy of another microcellular injection molded article of the invention.

In another embodiment, the invention provides a technique for rapidly and efficiently introducing a blowing agent into a fluid polymeric precursor in injection molding apparatus as described herein, as well as in extrusion apparatus in accordance with essentially any arrangement. This embodiment includes an extrusion screw, illustrated in FIG. 9, having an orifice in a surface of the screw positionable within an extrusion barrel (not shown) that fluidly communicates with a source of blowing agent. The orifice defines the terminus of a lumen passing from a location connectable to the source, such as a location at the proximal end of the screw. In a preferred embodiment, the lumen passes longitudinally along the rotational axis of the screw from the proximal end of the screw and connects with one or more orifices on the surface of the screw. The one or more orifices preferably are located at outer surfaces of screw flights or can be slightly recessed from outer surfaces of flights, this positioning allowing introduction of blowing agent in a manner such that the blowing agent undergoes shearing/diffusion against the inner surface of the barrel. One or more orifices can be located in regions between flights as well, or a combination of orifices at a variety of locations can be used. Referring to FIG. 9, an extruder screw 130 includes a flight 132 and a lumen 134 that provides communication with an orifice 136 on an exterior surface 138 of flight 132. Portion 140 of lumen 134 passes from the lumen at the central axis of the screw to orifice 136. One advantage in the introduction of blowing agent via an orifice within a screw is that uniformity of blowing agent level or distribution within a polymeric precursor can be provided in an arrangement using a reciprocating screw because of a fired injection point on the screw.

The techniques of the invention described above can be used also in gas-assist co-injection. In this technique a precursor of microcellular material is extruded and nucleated while being introduced into a mold, as described above, while gas is injected into the melt stream in such a way as to form, in the mold, an exterior layer against the mold walls of nucleated polymeric material and a central void filled with the co-injected gas. Cell growth can be made to occur as in other embodiments.

Microcellular polymeric articles or non-microcellular polymeric foam articles can be produced having thicknesses, or cross-sectional dimension, of less than 0.125 inch, preferably no more than 0.100 inch, more preferably no more than about 0.075 inch, more preferably no more than about 0.050 inch, more preferably no more than about 0.025 inch, more preferably still no more than about 0.010 inch, via injection molding, because a single-phase solution of polymer precursor and supercritical fluid has a particularly low viscosity and, in this manner, can be injected into a mold and formed as a foamed article therein. For example, a single-phase solution of supercritical fluid and polymer can be introduced into a mold and a conventionally-foamed or microcellular article can be produced thereby. The low viscosity of the fluid injected into the mold allows injection-mold cycle times, as described above, of less than 10 minutes, preferably less than 5 minutes, and more preferably less than 1 minute, preferably less than 30 seconds, more preferably less than 20 seconds, more preferably less than 10 seconds, and more preferably still less than 5 seconds.

The invention provides also for the production of molded microcellular polymeric articles or molded non-microcellular polymeric foam articles of a shape of a molding chamber, including at least one portion have a cross-sectional dimension of no more than about 0.125 inch or, in other embodiments, smaller dimensions noted above, the article having a void volume of at least about 5%. Preferably, the void volume is at least about 10%, more preferably at least about 15%, more preferably at least about 20%, more preferably at least about 25%, and more preferably still at least about 30%. In other embodiments the article has a void volume of at least about 50%. This is a significant improvement in that it is a challenge in the art to provide weight reduction in polymeric material, via foam void volume, in articles having very small dimensions. The articles of the invention include the above-noted void volumes in those sections that are of cross-sectional dimension of no more than about 0.125 inch, or other, smaller dimensions noted above.

The invention also provides for the production of molded microcellular polymeric articles or molded non-microcellular foam polymeric articles having a variety of thicknesses and void volumes.

In one set of embodiments, the molded articles include at least one portion having a cross-sectional dimension of between about 0.075 inch and about 0.125 inch and a void volume of at least about 10%. The molded articles of this embodiment preferably have a void volume of at least about 20%, more preferably at least about 30%, more preferably at least about 40%, and still more preferably at least about 50%.

In another set of embodiments, the molded articles include at least one portion having a cross-sectional dimension of between about 0.125 inch and about 0.150 inch and a void volume of at least about 15%. The molded articles of this embodiment preferably have a void volume of at least about 20%, more preferably at least about 30%, more preferably at least about 40%, and still more preferably at least about 50%.

In another set of embodiments, the molded articles include at least one portion having a cross-sectional dimension of between about 0.150 inch and about 0.350 inch and a void volume of at least about 20%. The molded articles of this embodiment preferably have a void volume of at least about 30%, more preferably at least about 40%, more preferably at least about 50%, more preferably at least about 60%, and still more preferably at least about 70%. In certain preferred embodiments of this set, the molded articles include at least one portion having a cross-sectional dimension of between about 0.150 and about 0.250 inch.

The methods of the invention also allow the production of higher weight reduction, as described herein, and smaller cells in injection molded parts having thicknesses greater than 0.125 inch, for example between 0.200 inch and about 0.500 inch thickness.

Figure 16:
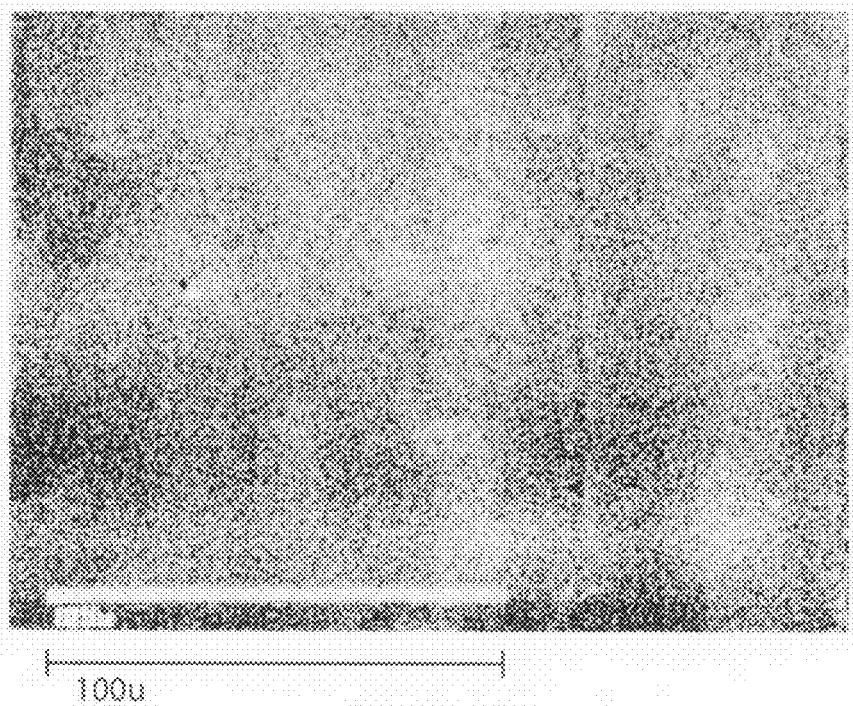
FIG. 16 is a photocopy of a photomicrograph of a surface of a comparative, prior art, solid non-foamed injection molded article.
Figure 17:
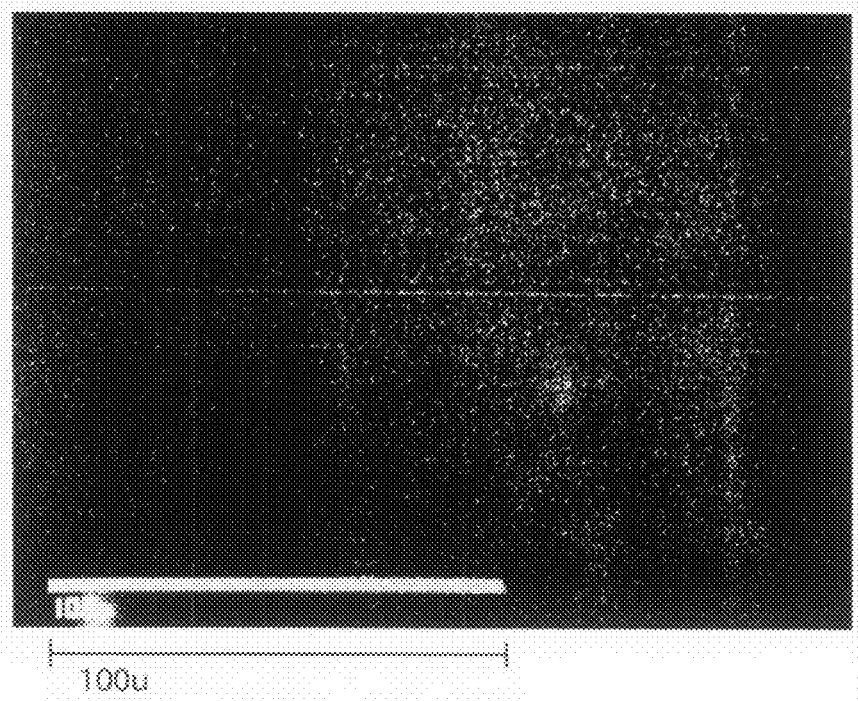
FIG. 17 is a photocopy of a photomicrograph of a surface of a microcellular injection molded article of the invention having a smooth surface free of splay and a swirl visible to the naked human eye.
Figure 18:
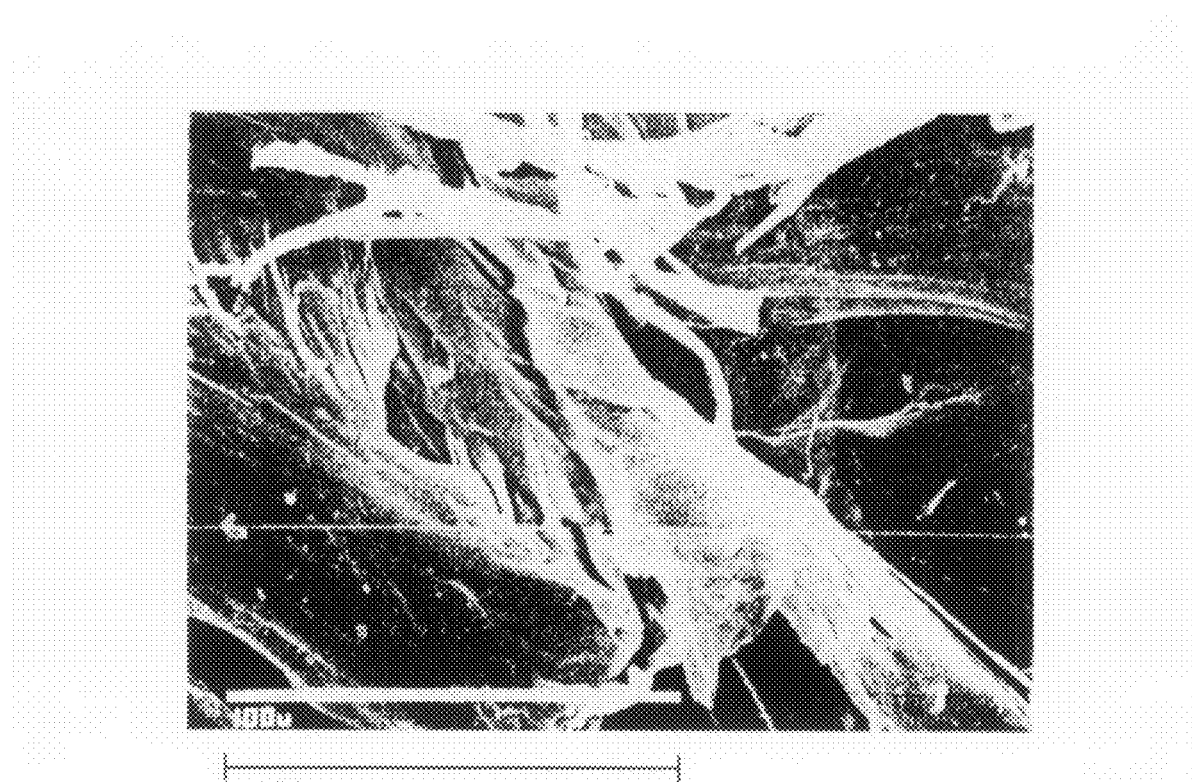
FIG. 18 is a photocopy of a photomicrograph of a surface of an injection molded foam polymeric article that includes swirls visible to the naked human eye.

The invention also provides a system and method to produce thick and thin foam molded parts with surfaces replicating solid parts. At least a portion of the surface of these parts is free of splay and swirl visible to the naked human eye. FIGS. 16-18, in conjunction with Example 9 (below) demonstrate formation of polymeric parts having surfaces free of splay and a swirl visible to the naked human eye. Such molded parts can be produced when the temperature of the melt and mold temperature and a blowing agent concentration is optimized to allow blowing agent to diffuse away from the surface of the part so that the surface includes a skin layer essentially free of cells. This skin layer is essentially solid polymer, thus the part appears as a solid polymeric part appears to the naked human eye. Splay and a swirl, in foamed polymeric material, is caused by bubbles at the surface being dragged against a mold wall. Where bubbles at the surface are removed, due to temperature control, splay and a swirl is avoided. In these embodiments molded parts are produced having an outer skin of essentially solid polymeric material free of cells, having a thickness at least three times the average cell size of the foam material. Preferably, the outer skin thickness is at least about five times the average cell size of the material. Another reason that molded parts can be produced, according to the invention, that are free of visible splay and a swirl is that the diffusion rate of a supercritical fluid blowing agent is believed by the inventors to be more rapid than that of typical blowing agents, allowing diffusion at the surface of the article to occur, as described, to form a solid skin layer.

As mentioned, the invention provides for the production of molded foam polymeric material, preferably microcellular material having thin sections. In particular, articles having high length-to-thickness ratios can be produced. The invention provides injection molded polymeric materials having length-to-thickness ratios of at least about 50:1 where the polymer has a melt index of less about 10. Preferably the length-to-thickness ratio is at least about 75:1, more preferably at least about 100:1, and more preferably still at least 150:1. In another embodiment an article is provided having a length-to-thickness ratio of at least about 120:1, the polymer having a melt flow rate of less than about 40. In this embodiment, the length-to-thickness is preferably at least about 150:1, more preferably at least 175:1, more preferably at least about 200:1, and more preferably still at least 250:1. Length-to-thickness ratio, in this context, defines the ratio of the length of extension of a portion of a polymeric molded part extending away from the injection location in the mold (nozzle) and the thickness across that distance.

One particularly advantageous combination of features of the invention is a thin molded part at a relatively high void volume. In particular, the invention provides foam polymeric articles having a portion of thickness less than about 1.2 millimeters and a void volume of at least 30%. In another embodiment a polymeric article having a thickness of less than about 0.7 millimeters is provided having a void volume of at least 15%.

In another set of embodiments, a series of molded polymeric articles are provided. At least 70% of the total number of cells in the polymeric articles of this set of embodiments have a cell size of less than 150 microns. Preferably, at least 30% of the total number of cells have a cell size of less than 800 microns, more preferably less than 500 microns, and more preferably less than 200 microns. In some embodiments of this set, at least 80%, preferably at least 90%, more preferably at least 95%, and still more preferably at least 99% of the total number of cells have a cell size of less than 150 microns. In certain embodiments, at least 80%, more preferably at least 90%, more preferably at least 95%, and still more preferably at least 99% of the total number of cells have a cell size of less than 100 microns. The molded articles of this set of embodiments can have a variety of void volumes. For example, the molded articles can have a void volume of at least 10%, at least 20%, at least 30%, at least 40%, or at least 50%.

In preferred embodiments, articles are provided having thicknesses as defined herein at void volumes defined herein, where the maximum thickness exists over at least about 25% of the article, that is, a least about 25% of the area of a thin molded part is of a thickness less than that described. In other embodiments more of the article can be of thickness less than the maximum defined, for example 50% or 100%.

Another molding system of the present invention is illustrated in FIGS. 19 and 20. Molding system 150 of these figures is designed to allow injection molding of microcellular polymeric material, particularly microcellular polyolefins such as polypropylene and polyethylene. System 150 allows for the production of relatively thick parts while avoiding EPP procedures of typical existing polypropylene foams. System 150 includes an inlet 152, constructed and arranged to receive a precursor of molded polymeric microcellular material, such as can be provided by an extruder and/or accumulator as illustrated in FIGS. 1, 2, and 5-7. A channel 154 connects inlet 152 with a molding chamber 156. Channel 154 includes a nucleating pathway 158 that has length and cross-sectional dimensions that create a pressure drop in a fluid, single-phase solution of polymeric material and blowing agent at a pressure drop rate sufficient to cause microcellular nucleation, when the solution is passed through the nucleating pathway at rates for which the system is constructed. Since the design of a molding system and the rate of introduction of polymeric material into a mold typically are planned in conjunction with each other, those of ordinary skill in the art will understand the meaning of reference to rates for which the system is constructed. Specifically, the nucleating pathway has length and cross-sectional dimensions that can create a pressure drop at a rate of at least about 0.3 GPa/sec in fluid polymeric material and blowing agent, as a single phase solution, for example when passing through the pathway at a rate of greater than 40 pounds fluid per hour. Other flow rates and pressure drop rates suitable for microcellular nucleation are apparent from reading the present application.

Channel 154 includes a cell growth region 160 between nucleating pathway 158 and molding chamber 156 that increases in cross-sectional dimension in the direction of the molding chamber. Channel 154 also includes a divergent portion 162 between inlet 152 and the molding chamber, specifically between the inlet and the nucleating pathway. Divergent portion 162 increases in width in a downstream direction (toward molding chamber 156) while decreasing in clearance (height). The result is an increase in width while maintaining a cross-sectional area that does not change significantly. Specifically, the divergent portion increases in width by at least about 100%, preferably at least by about 200%, and more preferably still by at least 300%, while maintaining across-sectional area that changes by no more than about 25%, preferably by no more than about 15%, and more preferably still by no more than about 10%. Divergent portion 162 allows for introduction of microcellular molded material precursor through inlet 152 and delivery of the precursor to nucleating pathway 158 while widening the pathway flow to a dimension equal to the width of molding chamber 156 while maintaining a relatively constant pressure profile in the material.

The arrangement of divergent section 162 and nucleating pathway 158 allows the nucleating pathway to have a width-to-height ratio (ratio of the dimension illustrated in FIG. 19 relative to the dimension illustrated in FIG. 20) of at least about 1.5:1, more preferably at least about 2.0:1, more preferably at least about 5.0:1, more preferably at least about 10:1, and more preferably still at least about 20:1. This allows the nucleating pathway to have a width equal to one dimension of molding chamber 156, thus microcellular polymeric articles that are both wide and thick can easily be nucleated and molded within system 150. In addition, conventional (i.e., non-microcellular) foam polymeric material can be injection-molded using the system of 150, as well. Specifically, non-foamed polymeric material can be injected into molding chamber 156 and allowed to foam, to have a shape essentially identical to that of the molding chamber (including by definition larger where an expanded, or "cracked" mold is used), the article having at least one portion having cross-sectional dimensions of at least one half inch in at least two perpendicular intersecting cross-sectional axes, and a void volume of at least about 50%. Higher void volumes of 60%, 70% and 80% also can be achieved using this system, in combination with any of higher thicknesses of at least about 0.75 inch, one inch, or 1.5 inch.

One specific advantage provided by the physical arrangement of divergent portion 162, nucleating pathway 158, and cell growth region 160 of system 150 allows for injection of the fluid, single-phase solution of polymeric material and blowing agent into the molding chamber system and, at a significant width dimension, subjecting the solution to a rapid pressure drop at the nucleating pathway to cause microcellular nucleation, and essentially immediately thereafter allowing and controlling cell growth in cell growth region 160 by subjecting the material to a pressure drop that is controlled, at a rate less than the pressure drop rate to which the solution is subjected in nucleating pathway 158, and that decreases during cell growth. That is, the pressure drop rate experienced by nucleated polymeric material in cell growth region 160 decreases during cell growth to provide uniform, controlled microcellular material.

The use of molding system 150 in conjunction with extrusion and/or accumulation apparatus described previously allows for the production of unique, thick and wide polymeric molded articles, including microcellular polymeric molded articles, that have a uniformity in cell structure much better than that of EPP and EPS foams. As noted above, in the production of EPP and EPS foams lines of fusion between beads, after molding, can be easily observed by the naked eye. The molded articles of the present invention, in contrast, are free of lines of fusion in the cell structure. That is, they are free of periodic solid boundaries (lines of fusion in molded EPP or EPS) of thickness greater than about 5 times the average cell wall thickness. Preferably, the articles are free of periodic solid boundaries of thickness greater than about 4 times average cell wall thickness, and more preferably still free of periodic boundaries greater than about 3 times average cell wall thickness.

System 150 also allows for production of thick and wide polymeric material, including microcellular polymeric material, at mold temperatures much lower than those typical of steam chest molding of EPP and EPS. In particular, a fluid precursor of foamed polymeric material can be injected into molding chamber 156 at a molding chamber temperature of less than about 100° C. The mixture then is allowed to solidify in the molding chamber as a polymeric article, preferably a polymeric microcellular article, including at least one portion having cross-sectional dimensions of at least one half inch in each of three perpendicular intersecting cross-sectional axes and a void volume of at least about 50% (or higher values noted above). Preferably, the mold temperature is less than about 75° C. in this technique, more preferably less than about 50° C., and more preferably still less than about 30° C.

The system also allows very rapid cycle times of injection molding of polymeric microcellular material of void volume of at least about 50% (or higher values noted above). In particular, a cycle time (repeated injecting of non-foam material, allowing the mixture to solidify in the molding chamber as a polymeric microcellular article, and removing the article from the mold and repeating) can be carried out at cycle time of less than about 1 minute, more preferably less than about 45 seconds, more preferably less than about 30 seconds, and more preferably still less than about 25 seconds.

It is known in the art that molding of material can inherently give a skin-foam-skin structure, and that the skin-foam-skin structure can be controlled based on temperature and other injection conditions to give a thicker or thinner skin. It is also known that a skin-foam-skin structure has a higher strength-to-weight ratio than a similar part without a skin or with a relatively thin skin. It is common practice to calculate strength in a skin-foam-skin molded partly based upon "I-beam" formulations. However, the applicants are unaware of any prior work that takes into account cell size in the prediction or calculation relating to the strength-to-weight ratio of any skin-foam-skin molded structure.

It is another feature of the present invention that very strong, thin parts can be made. In particular, due to the ability to form very thin foam parts with very small cells, that retain a skin-foam-skin structure, previously impossible with thin foam parts, unexpected tensile strength-to-weight ratios in molded materials is achieved. In particular, the present invention provides molded polymeric parts including at least one very thin section, having strength-to-weight ratios (represented as strength-to-density), of at least about 280,000 psi/g/cm$^3$, more preferably at least about 290,000 psi/g/cm$^3$, and more preferably still at least about 300,000 psi/g/cm$^3$. The thin sections of these parts have a thickness of less than about 0.250 inch, or of less than about 0.150 inch, or of less than about 0.100 inch, and in each of these cases have each of the strength-to-weight ratios described above.

Although not wishing to be bound by any theory, the applicants believe that the unexpected strength-to-weight ratios observed in accordance with the invention are due to maximizing the number of cell walls across a thin section as cell size is minimized. That is, looking at a cross-section of a thin skin-foam-skin structure with relatively larger cells, relatively fewer cell walls will exist across the structure, and the possibility of one cell bridging the entire foam structure exists. Such a bridge would create a very weak link in the structure. In contrast, in microcellular skin-foam-skin structure of the present invention, the number of cells (thus the number of cell walls) across the structure between skin sections is maximized, and a uniform cellular polymer network and uniform strength characteristic across the foam between the skin structures exists. Thus, while in thin parts of the invention the average strength throughout the part may be similar to that of the average strength with a structure having larger cells, articles of the present invention are stronger because the point of typical minimum strength representing a cell or void bridging the entire structure is eliminated.

It is another feature of the present invention that articles can be produced that are opaque without the use of opacifiers. This is because polymeric foam diffracts light, thus it is essentially opaque and has a white appearance. It is a feature of the invention that microcellular foams are more opaque, and uniformly so, than conventional foams. This is a significant advantage in connection with articles constructed and arranged to contain material that is subject to destruction upon exposure to light, such as food containers. Such material can involve food consumable by animals such as humans, containing vitamins that can be destroyed upon exposure to light. While opacifiers such as pigments are typically added to articles, pigmented material is less amenable to recycling. The present invention provides thin, opaque articles that include less than about 1% by weight auxiliary opacifer, preferably less than about 0.05% by weight auxiliary opacifer, and more preferably still material that is essentially free of auxiliary opacifer. "Auxiliary opacifer", in the present invention, is meant to define pigments, dyes, or other species that are designed specifically to absorb light, or talc or other materials that can block or diffract light. Those of ordinary skill in the art can test whether an additive is an opacifer. Microcellular blow molded articles of the invention have the appearance of essentially solid, white, plastic articles, which offers significant commercial appeal.

The systems of the invention can include a restriction element (not shown) as described in co-pending U.S. application Ser. No. 09/285,948, filed Apr. 2, 1999, entitled "Methods For Manufacturing Foam Material Including Systems With Pressure Restriction Element" which is incorporated herein by reference. The restriction element, such as a check valve, is positioned upstream of a blowing agent injection port to maintain the solution of polymer and blowing agent in the extruder above a minimum pressure throughout an injection cycle, and preferably above the critical pressure required for the maintenance of a single-phase solution of polymer and blowing agent.

The systems of the invention can include heated runners (not shown). The term "runner" as used herein, is meant to define a fluid pathway that fluidly connects the outlet end of the injection system (outlet of nucleator according to some embodiments) and the molding chamber, and/or fluidly connecting various portions of the molding cavity for example where complex molded shapes are desired. Runners are known in the art. In some conventional foam injection molding systems, material left in runners hardens, and is removed with the molded part. The present invention provides runners addressed by thermal control units, such as passageways for flowing heated fluid. This is useful in accordance with certain embodiments of the present invention in which it is advantageous to maintain the polymeric article precursor material in a fluid state within the runners in order to eliminate a pressure drop that can occur if a gap in material were to occur within the runner, when, for example, hardened material has been removed. The arrangement of the invention can involve, for example, an extruder for supplying a fluid, single-phase solution of polymeric material and blowing agent, a nucleating pathway, and downstream of the pathway a runner between the pathway and a molding chamber, the runner including a valve at its downstream end to be opened when the mold is to be filled and closed when the mold is to be opened and an article removed. If molten polymeric material is used, then if the runner is heated the nucleated material in the runner will remain fluid and suitable for injection into the mold. The embodiment of the invention including temperature-controlled runners can find use in any of a wide variety of injection moldings systems, involving any number of runners between various components, and valves positioned, if needed, appropriately to allow for filling molds or mold sections periodically without the need for removal and discarding of hardened material from the runners. The runner can be the nucleating pathway.

The function and advantage of these and other embodiments of the present invention will be more fully understood from the examples below. The following examples are intended to illustrate the benefits of the present invention, but do not exemplify the full scope of the invention. The examples below demonstrate advantages of injection molding of a charge of polymeric material and supercritical fluid blowing agent, in that articles are formed that have a surface, corresponding to an interior surface of a molding chamber, that is free of splay and swirl visible to the naked human eye.

EXAMPLE 1

A two stage injection molder (Engel manufacture) was constructed with a 32:1 l/d, 40 mm plasticizing unit which feeds melted polymer into a 40 mm diameter plunger. The plunger and plasticizing units were connected by a spring loaded ball check joiner assembly. The plunger was able to inject into a mold through a typical pneumatically driven shut-off nozzle. Injection of supercritical $CO_2$ was accomplished by placing at approximately 16 to 20 diameters from the feed section an injection system that included one radially positioned port containing 176 orifices of 0.02 inch diameter. The injection system included an actuated control valve to meter a mass flow rate of blowing agent at rates from 0.2 to 12 lbs/hr.

The plasticator was equipped with a two stage screw including a conventional first stage feed, barrier, transition, and metering section, followed by a multi-flighted mixing section for blowing agent homogenization. The barrel was fitted with heating/cooling bands. The design allowed homogenization and cooling of the homogeneous single phase solution of polymer and gas.

The hydraulic system used to move all parts of the molding machine was modified to have a melt pressurization pressure of at least 1000 psi, but not more than 28,000 psi at all times. This technique controls and maintains the single phase solution of polymer and gas at all times before plastic injection into the mold.

EXAMPLE 2

Injection Molding Microcellular Polystyrene

The molding machine as described in example 1 was used to mold microcellular polystyrene plaques. Polystyrene pellets (Novacor 2282, 11 M.I.) were fed into the plasticator and, in most cases, mixed with blowing agent to form a single-phase solution, then nucleated by injection into a 5×11×0.050 inch, center gated plaque mold. Injection occurred through a cold sprue. Injection rate was varied to determine the relationship between the processing variables and cell size and weight reduction. Cell size was controlled to under 30 microns and weight reduction as high as 20%. See Tables 1 and 2 and corresponding FIGS. 10-15.

TABLE 1

Effect of Injection Speed on Cell Size and Weight Reduction

| Injection Speed ("/sec) | Cell Size (microns) | Blowing Agent (%) | Weight Reduction (%) | FIG. |
|---|---|---|---|---|
| 11 | No Cells | 11.9 | 11 | 10 |
| 5 | 100 | 11.9 | 11 | 11 |
| 4 | 10 | 11.9 | 19 | 12 |
| 2 | 10 | 11.9 | 18 | 13 |
| 1 | 30 | 11.9 | 12 | — |

TABLE 2

Effect of Gas Concentration on Cell Size and Weight Reduction
Melt temperature = 160° C.
Mold Temperature = 66° C.
Injection Speed = 4.0"/sec
Sprue = .375' diameter

| Gas Concentration (lbs./hr.) | Cell Size (microns) | Weight Reduction (%) | Blowing Agent (%) | FIG. |
|---|---|---|---|---|
| 0.9 | 20 to 150 | 21 | 13.4 | 14 |
| 1.4 | 1 to 5 | 23 | 21 | 15 |

EXAMPLE 3

Injection Molding Microcellular Polyethylene Terephthalate

The injection molding machine described in example 1 was used to mold PET (Eastman, 0.95 IV) into a 5×11×0.200 inch cavity after drying for four hours at 350 F. The melt processing temperature was 550 F, the mold temperature was 151 F and was injected with 12% $CO_2$. The melt pressurization pressure was maintained at 3000 psi and the injection speed 5.0 inches per second.

The weight reduction was 30% and the cell size was 30 to 40 microns in diameter.

EXAMPLE 4

Injection Molding Polypropylene to High Levels of Weight Reduction

The injection molding machine described in example 1 was used to mold polypropylene (4 melt flow rate (MFR), copolymer, Montell 7523), polypropylene (20 MFR, copolymer, Montell SD-376) and a talc-filled polypropylene (4 MFR, 40% talc-filled, Montell 65f4-4) into a 5×11×inch plaque with variable thickness. High weight reductions were accomplished by using the following conditions:

TABLE 3

| Material | Part Thickness (inches) | Weight Reduction (%) | Melt Temperature (F.) | Gas Percent (%) | Mold Temperature (F.) |
|---|---|---|---|---|---|
| 7523 | .050 | 14.6 | 310 | 12.5 | 100 |
| SD-376 | .100 | 30 | 320 | 12 | 150 |
| 65f4-4 | .100 | 15 | 330 | 15 | 200 |

EXAMPLE 5

Injection Molding Polystyrene Parts with Density Reductions Greater than 70%

The injection molding machine described in example 1 was used to mold polystyrene under conditions similar to those found in example 2, but with mold temperatures ranging from 150 F to 250 F and cooling times ranging from 3.2 to 22.8 seconds. Large density reductions were seen as follows:

TABLE 4

| Mold Temperature (F.) | Melt Temperature (F.) | Cooling Time (sec) | Solid Part Density | Foam Density | Density Reduction |
|---|---|---|---|---|---|
| 150 F. | 250 | 3.2 | .88 g/cc | .37 g/cc | 58% |
| 250 F. | 250 | 22.8 | .88 g/cc | .16 g/cc | 82% |

EXAMPLE 6

Post Mold Nucleation and Cell Growth of a Solidified Polymer/Supercritical Fluid Part The injection molding machine described in Example 1 was used to mold polystyrene (Novacor 2282, 11 M.I.). Polystyrene pellets were fed into the plasticator and injected as described in Example 2. The material injected into the mold was cooled in the mold to a temperature below the solidification temperature of the polystyrene. The mold was opened and the part was removed in a non-foamed state. The part then was subjected to an external heat source (glycerine bath) whereupon it foamed. A microcellular article resulted.

EXAMPLE 7

Demonstration of Viscosity Reduction in Polymer Molding

This example demonstrates the advantage of using supercritical fluid blowing agent to reduce viscosity for introduction of polymeric material into a mold, at relatively low melt temperatures, while realizing the benefits of microcellular foaming.

A molding machine was used to mold polystyrene as described in Example 2 with the following exception. The mold had dimensions of 5×11×0.020 inches. Under the same conditions of Example 2 polystyrene was injected with 0% blowing agent. The maximum flow length obtainable was 1 inch resulting in a length-to-thickness ratio of 50. An identical experiment was run with 15% supercritical carbon dioxide blowing agent. The maximum flow length was at least 5.5 inches with a length-to-thickness ratio of 270.

EXAMPLE 8

Injection Molding of Polypropylene Below its Crystalline Melting Point

The injection molding machine described in Example 1 was used to mold polypropylene (4 MFR, copolymer, Montell 7523) into a 5×11×0.050 inch mold. With 0% blowing agent, minimum melt temperatures needed to fill such a mold is 430° F. With 15% supercritical carbon dioxide blowing agent it was possible to inject polypropylene below its crystalline melting point which is nominally 325° F. Actual melt temperature was 310° F.

EXAMPLE 9

Demonstration of a Microcellularly Foamed Article with a Near Perfect Surface A molding machine as described in Example 2 was used to mold polystyrene (Novacor 2282 11 M.I.). Polystyrene pellets were fed into a plasticator and mixed with $CO_2$ blowing agent to form a single phase solution of supercritical $CO_2$ and polystyrene, then nucleated by injection into a 5×11×0.050 inch plaque mold. Processing conditions were optimized to identify the appropriate conditions to obtain a high nucleation density, as well as a solid, splay-free looking skin. Photocopies of photomicrographs are provided as FIGS. 16-18 to demonstrate the effectiveness of this technique. FIG. 16 is provided for comparison, and shows solid non-foamed polystyrene, injection molded using standard, non-foam injection molding techniques:

FIG. 17 is a photocopy of a photomicrograph of a surface of a microcellular injection molded article of the invention having a smooth surface free of splay and a swirl visible to the naked human eye.

FIG. 18 is a photocopy of a photomicrograph of a surface of an injection molded foam polymeric article that includes swirls visible to the naked human eye.

As can be seen, ideal conditions involve a balance of melt temperature, mold temperature, and blowing agent concentration. The melt temperature must be high enough so that blowing agent diffusion rate in the melt is relatively rapid, and the mold temperature must be high enough so that blowing agent diffusion out of the melt occurs to a significant degree at the surface, but the mold temperature must be low enough to avoid warpage and other distortion of the product. The blowing agent diffusion rate is dependent upon melt temperature, blowing agent concentration, differential pressure, and mold temperature. The diffusion rate of the blowing agent out of the melt must be greater than the rate at which the polymer surface cools and solidifies.

TABLE 5

| Surface Characteristics | FIG. | Temp. Melt (° F.) | Temp. Mold (° F.) | Injection Speed (I.P.S.) | Blowing Agent (%) |
|---|---|---|---|---|---|
| Solid Looking | 17 | 400 | 175 | 5.0 | 11.50 |
| Streaks | | 350 | 80 | 3.0 | 5.15 |
| Bubbles | | 350 | 80 | 4.4 | 23% |
| Warped, Small Bubbles on Surface | | 410 | 180 | 2.0 | 11.50 |
| Solid, But Cracked | | 385 | 160 | 3.5 | 9.75 |
| Swirls | 18 | 400 | 87° | 10 | 13.25% |

EXAMPLE 10

The injection molding system as described in example 1 was used to mold Polypropylene (Montell 6823, Montell 6523, and blends of 6823 and Dow's metallocene catalyzed polyethylene) into a 1.25×4×0.600 deep cavity. A molding system is shown in FIGS. 19 and 20 was used. The melt temperature and gas percentage could be varied to produce various densities with cell sizes ranging from 1 to 50 microns. The resulting parts were of densities as low as 1.8 pounds per cubic foot and as high as 20 PCF. Higher densities could easily be made if desired. Additionally these same densities and cell structures can be made through a method of crack molding whereby the melted polymer is injected into a partially opened mold and then cracked completely open. Low density PP and low density blends of PE and PP, respectively, were produced with uniform cell structures. See Table 6 for parameters.

TABLE 6

| Gas (lbs/hr) | Cell Size | Density (PCF) | Melt Temperature (F.) | Material | % Gas |
|---|---|---|---|---|---|
| .6 | 20 | 12.7 | 310 | 6823 | 14 |
| .6 | 1-15 | 4.9 | 300 | 6823 | 14 |

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method of molding a polymeric foam article comprising:
conveying a polymeric material in a downstream direction in an extruder including a barrel and a screw, wherein the screw rotates and reciprocates within the barrel;
introducing a blowing agent into the polymeric material at a rate metered by the mass flow of the blowing agent and at a position that is a function of the axial position of the screw within the barrel to form a mixture of polymeric material and blowing agent; and injecting the mixture of polymeric material and blowing agent into a molding chamber fluidly connected to the barrel.

2. A method as in claim 1, wherein the amount of blowing agent in the mixture is between 0.1% and 2.5% based on the weight of the mixture of precursor material and blowing agent.

3. A method as in claim 1, wherein the mass flow rate of the blowing agent is between 0.04 lbs/hour and 12 lbs/hour.

4. A method as in claim 1, wherein the mass flow rate of the blowing agent can be controlled within +/−0.3%.

5. A method as in claim 1, wherein the blowing agent comprises carbon dioxide.

6. A method as in claim 1, wherein the blowing agent comprises nitrogen.

7. A method as in claim 1, wherein the blowing agent is introduced into the polymeric material through a blowing agent port formed in a barrel of an extrusion apparatus.

8. A method as in claim 1, further comprising forming a microcellular article having an average cell size of less than 100 microns in the molding chamber.

9. A method as in claim 1, wherein the mixture is nucleated to form microcells by a pressure drop when injecting the mixture of polymeric material and blowing agent into a molding chamber fluidly connected to the barrel.

\* \* \* \* \*